(12) United States Patent
Weaver et al.

(10) Patent No.: US 10,758,083 B2
(45) Date of Patent: Sep. 1, 2020

(54) GRILL AND FOOD CONTAINING ASSEMBLY FOR HANDS-FREE ROTATION AND FLIPPING OF FOOD PRODUCTS

(71) Applicant: Flippin' BBQ, Charlotte, NC (US)

(72) Inventors: Timothy Weaver, Rock Hill, SC (US); Shane Murphy, Charlotte, NC (US); Olando Dicks, Charlotte, NC (US); Dave Dicks, Fort Mill, SC (US)

(73) Assignee: FLIPPIN' BBQ, Charlotte, NC (US)

( * ) Notice: Subject to any disclaimer, the term of this patent is extended or adjusted under 35 U.S.C. 154(b) by 289 days.

(21) Appl. No.: 15/921,760

(22) Filed: Mar. 15, 2018

(65) Prior Publication Data
US 2019/0282027 A1    Sep. 19, 2019

(51) Int. Cl.
*A47J 37/07* (2006.01)
*A47J 37/04* (2006.01)

(52) U.S. Cl.
CPC ......... *A47J 37/041* (2013.01); *A47J 37/0704* (2013.01); *A47J 37/0745* (2013.01)

(58) Field of Classification Search
CPC ... A47J 37/041; A47J 37/0745; A47J 37/0704
See application file for complete search history.

(56) References Cited

U.S. PATENT DOCUMENTS

| | | | | |
|---|---|---|---|---|
| 3,673,948 A | * | 7/1972 | Albright | A47J 37/06 99/355 |
| 6,784,559 B1 | * | 8/2004 | Simonds | A63B 35/125 114/315 |
| 8,895,092 B1 | * | 11/2014 | Field | B65B 25/06 206/497 |
| 2011/0271949 A1 | * | 11/2011 | Ortner | A47J 37/0704 126/25 R |
| 2015/0282660 A1 | * | 10/2015 | Sarvestani | A47J 37/0786 99/331 |
| 2016/0334106 A1 | * | 11/2016 | Reinhart | F24C 15/32 |

* cited by examiner

*Primary Examiner* — John C Hong
(74) *Attorney, Agent, or Firm* — NK Patent Law

(57) ABSTRACT

The subject matter described herein includes a method of operating a grill having a food containing assembly. The method includes installing a first cooking grate in a perimeter grate frame and in spaced-apart relationship to a second cooking grate to which food is placed on. The method also includes cooking the food for a period of time and translating the food containing assembly, where the perimeter grate frame rotates at least 180 degrees from an original position. The method also includes cooking the food for an additional period of time, translating the food containing assembly to the original position, displacing the first cooking grate from the perimeter grate frame, and removing the food.

12 Claims, 30 Drawing Sheets

GRILL AND FOOD CONTAINING ASSEMBLY FOR HANDS-FREE ROTATION AND FLIPPING OF FOOD PRODUCTS

TECHNICAL FIELD

The presently disclosed subject matter is directed towards a grill. Specifically the presently disclosed subject matter is directed towards a grill having a food containing assembly for hands-free rotation and flipping of food products.

BACKGROUND

A common problem with modern day grilling is food sticking to and burning on to cooking grates. Often the grilling surface includes grates made from stainless steel or cast iron, both of which are capable of withstanding extremely high temperatures without deforming. During the grilling process it becomes necessary to flip the food with the aid of a spatula or tongs. Lifting the food off of the cooking grate often results in the loss of large quantities of food. This happens when the food sticks to the grates or falls between the grates into a firebox. The accumulation of food in the firebox can affect the performance and lifespan of a grill. Lost food and damage to the firebox, and other elements inside the grill, can add thousands of dollars to the expense of grilling.

The presently disclosed subject matter provides an improved method for grilling that overcomes the disadvantages of the prior art.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a method of operating a grill having a food containing assembly. The method includes installing a first cooking grate in a perimeter grate frame and in spaced-apart relationship to a second cooking grate to which food is placed on. The method also includes cooking the food for a period of time and translating the food containing assembly, where the perimeter grate frame rotates at least 180 degrees from an original position.

The method also includes cooking the food for an additional period of time, translating the food containing assembly to the original position, displacing the first cooking grate from the perimeter grate frame, and removing the food.

According to one or more embodiments, translating the food containing assembly comprises operating a hand bar apparatus.

According to one or more embodiments, translating the food containing assembly comprises operating a foot bar apparatus.

According to one or more embodiments, translating the food containing assembly comprises activating an electric motor apparatus.

According to one or more embodiments is a grill for hands-free rotation and flipping of food to promote even cooking. The grill includes a firebox that has a food containing assembly, a lid, and a housing. The food containing assembly includes a first cooking grate and a spaced-apart second cooking grate to which food is positioned there between. The food containing assembly also includes an actuator for translating the first and second cooking grates.

According to one or more embodiments, the lid includes a handle and a window.

According to one or more embodiments, the actuator includes a motor which is engaged to a power source.

According to one or more embodiments, the power source is at least one of a battery that is rechargeable through AC power, a battery that is rechargeable through solar power, and standalone AC power.

According to one or more embodiments, the housing includes a propane tank, a power source, and wheels.

According to one or more embodiments, the grill includes a detachable side tray.

According to one or more embodiments, the firebox includes a drip tray.

According to one or more embodiments, the grill includes a side burner.

According to one or more embodiments, the grill includes a side tray.

According to one or more embodiments, a grill includes a food containing assembly. The food containing assembly includes a first cooking grate and a spaced apart second cooking grate. The first cooking grate and the second cooking grate are rotatable relative to a housing of the grill, such that food displaced within the food containing assembly can be rotated relative to a heating source, while maintaining placement relative to the food containing assembly.

According to one or more embodiments, the grill includes a communications interface that is operably coupled to an actuator. The communications interface is configured to receive instructions from a mobile device to actuate the actuator.

According to one or more embodiments a food containing assembly includes a perimeter grate frame. The frame is substantially rectangular in shape. The assembly also includes a substantially rectangular first cooking grate having latches configured to engage with a top side of the perimeter grate frame. The latches are positioned equidistant across opposing edges of the first cooking grate. The assembly also includes a second cooking grate engaged to a bottom side of the perimeter grate frame, two legs engaged to opposite sides of the perimeter grate frame; and an actuator connectedly engaged with the perimeter grate frame.

According to one or more embodiments, the actuator is at least one of a hand bar apparatus, a foot bar apparatus, and an electric motor apparatus.

According to one or more embodiments, the food containing assembly includes rockers. The rockers are engaged with the perimeter grate frame and lift the frame in a vertical direction as the frame is rotated.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
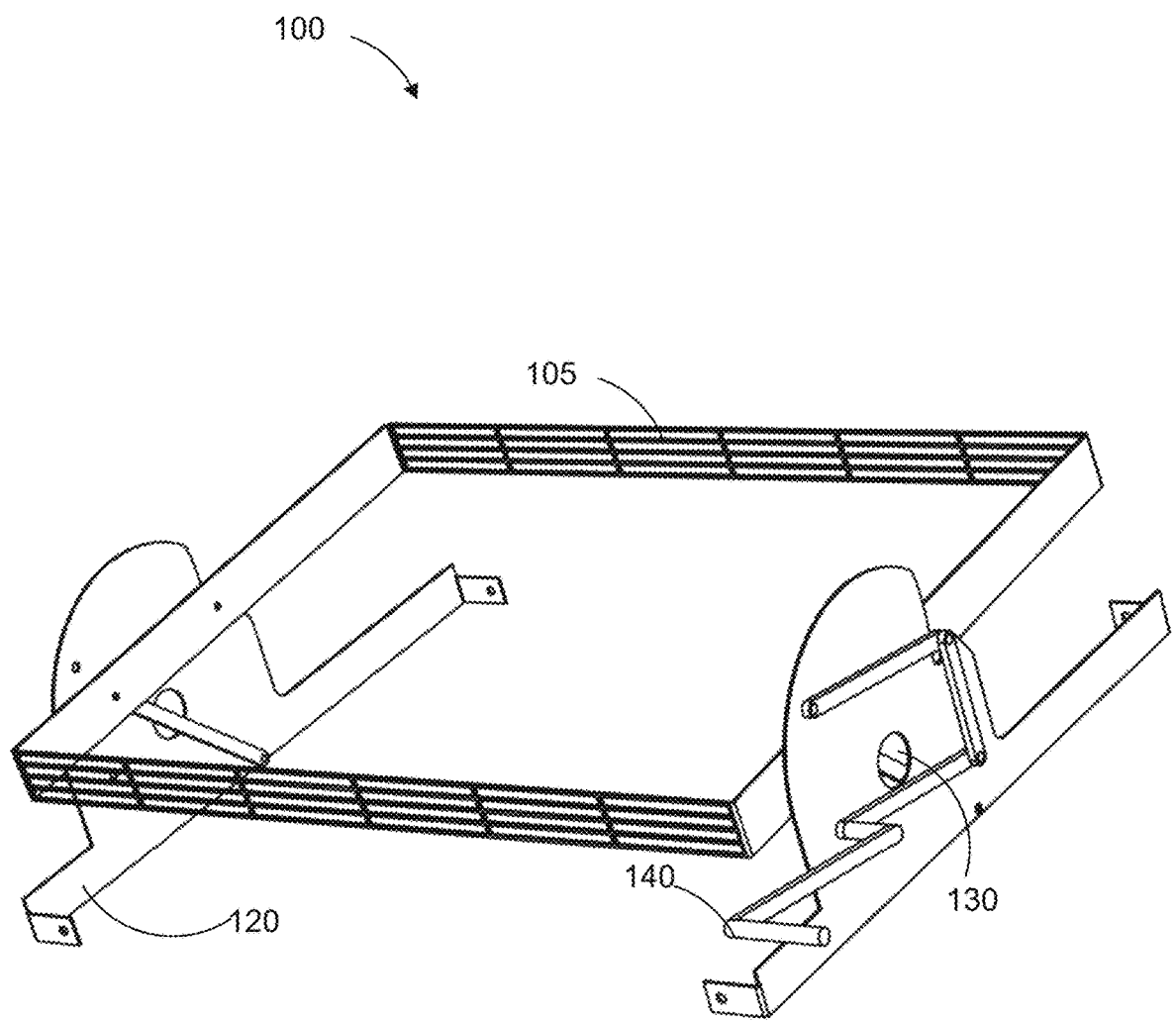
FIG. 1 is a perspective view of a food containing assembly according to one or more embodiments of the presently disclosed subject matter.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the presently disclosed subject matter.

At least one embodiment of the presently disclosed subject matter is illustrated throughout the drawings and in particular reference to FIG. 1. Disclosed herein is a food containing assembly 100. The food containing assembly 100 includes a perimeter grate frame 105, an actuator, and legs 120. The frame 105 is connectedly engaged to the actuator and legs 120. The food containing assembly 100 can be made from any substance known or used in the art, including but not limited to, enamel, sheet metal, cast iron, ceramic, porcelain, aluminum and stainless steel. In one embodiment of the presently disclosed subject matter, the actuator is a hand bar apparatus 140 as shown in FIG. 1. The legs 120 may define an orifice 130 through which the legs 120 can connect to the frame 105.

Figure 2:
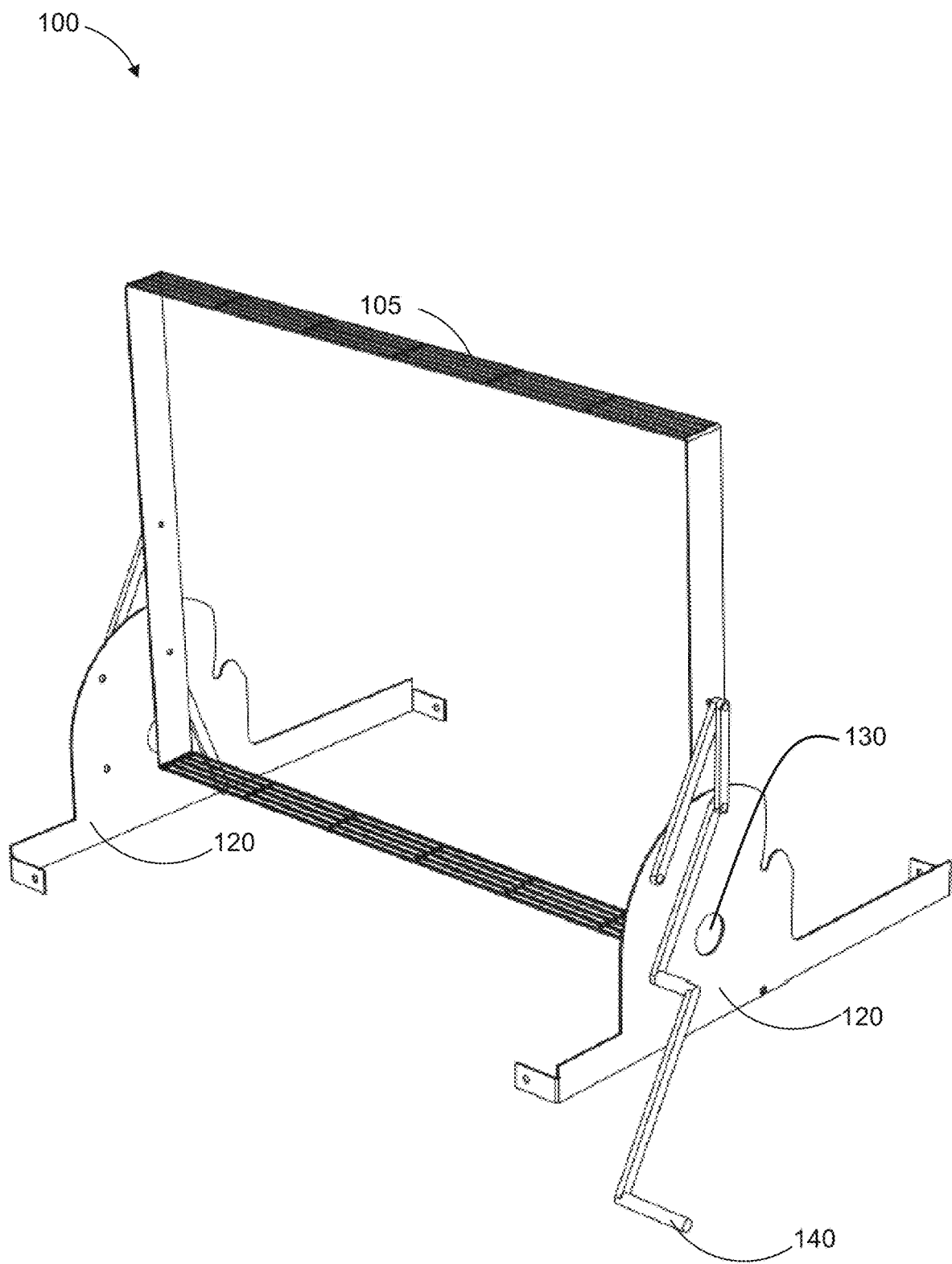
FIG. 2 is a perspective view of the food containing assembly in a vertical position according to one or more embodiments of the presently disclosed subject matter.
Figure 3:
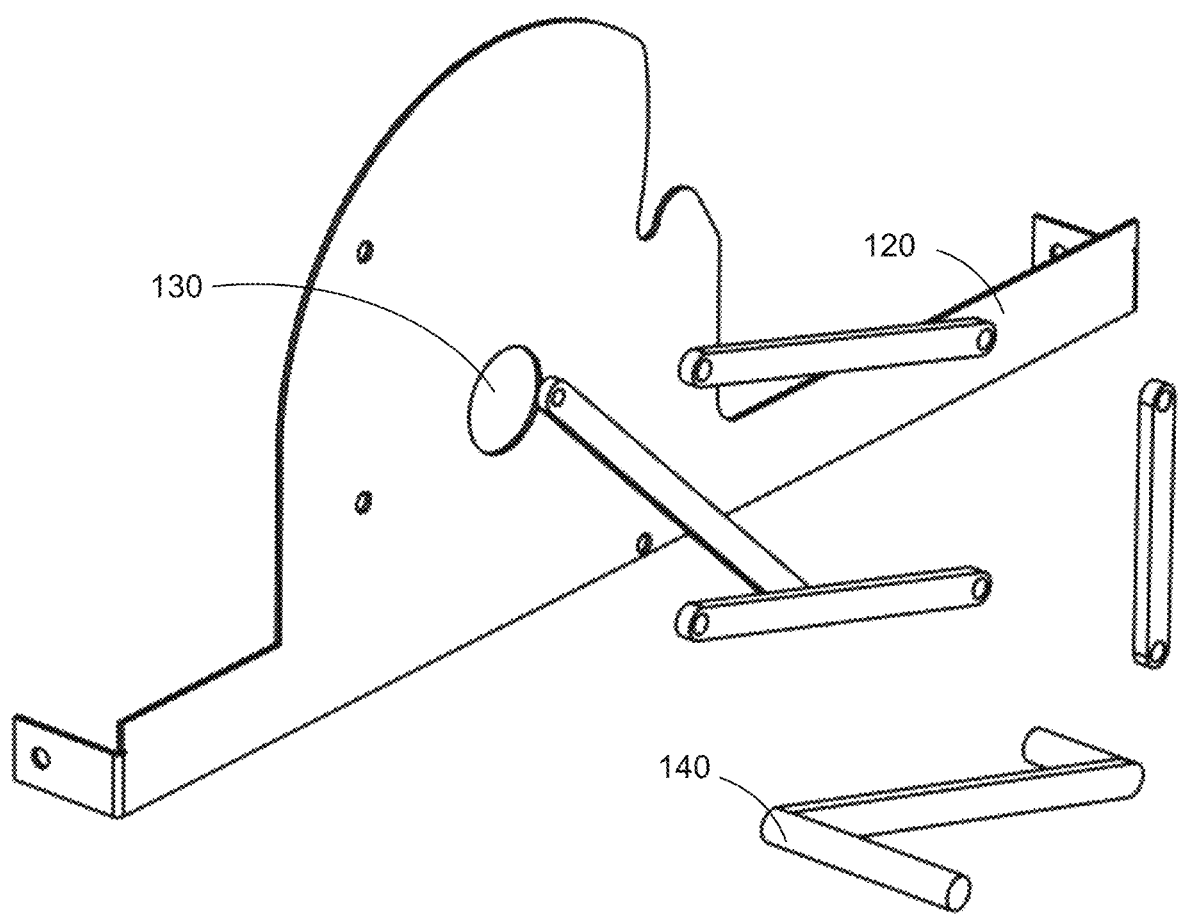
FIG. 3 is a disassembled view of a side portion of the food containing assembly according to one or more embodiments of the presently disclosed subject matter.

When the hand bar apparatus 140 is engaged by a user, the frame 105 rotates 90 degrees as shown in FIG. 2. As the user continues to engage the hand bar apparatus 140, the frame 105 flips completely over, rotating a full 180 degrees. FIG. 3 shows an exploded view of the hand bar apparatus 140 in relation to the leg 120.

Figure 4:
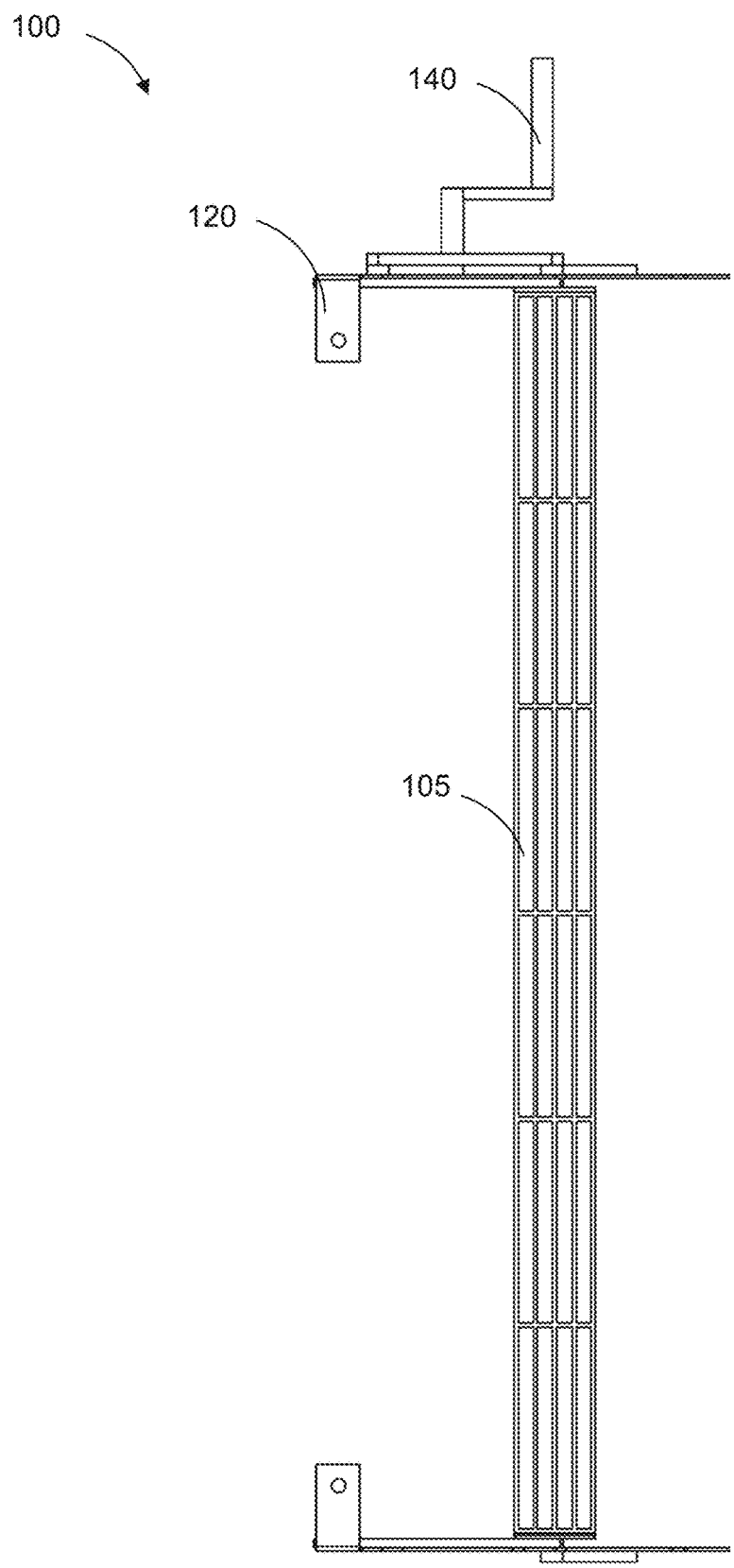
FIG. 4 is a front perspective view of the food containing assembly according to one or more embodiments of the presently disclosed subject matter.
Figure 5:
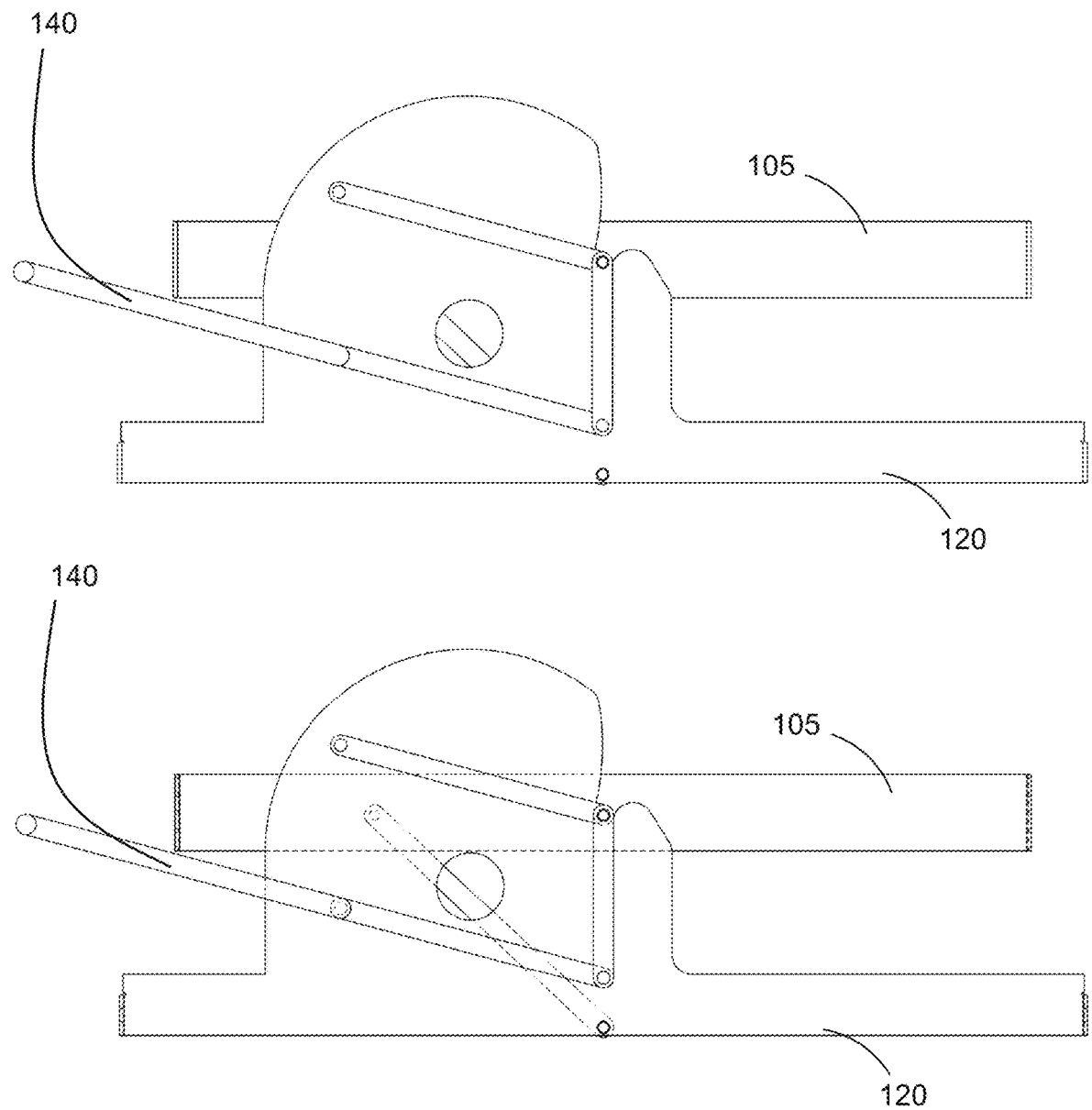
FIG. 5 illustrates two side views of the food containing assembly according to one or more embodiments of the presently disclosed subject matter.

FIG. 4 is a front facing view of the food containing assembly 100 with the frame 105 in a horizontal position and connectedly engaged to the legs 120 and the hand bar apparatus 140. FIG. 5 is a side view of the food containing assembly 100. The hand bar apparatus 140 can be seen through the orifice 130 and engages the frame 105 to the legs 120.

Figure 6:
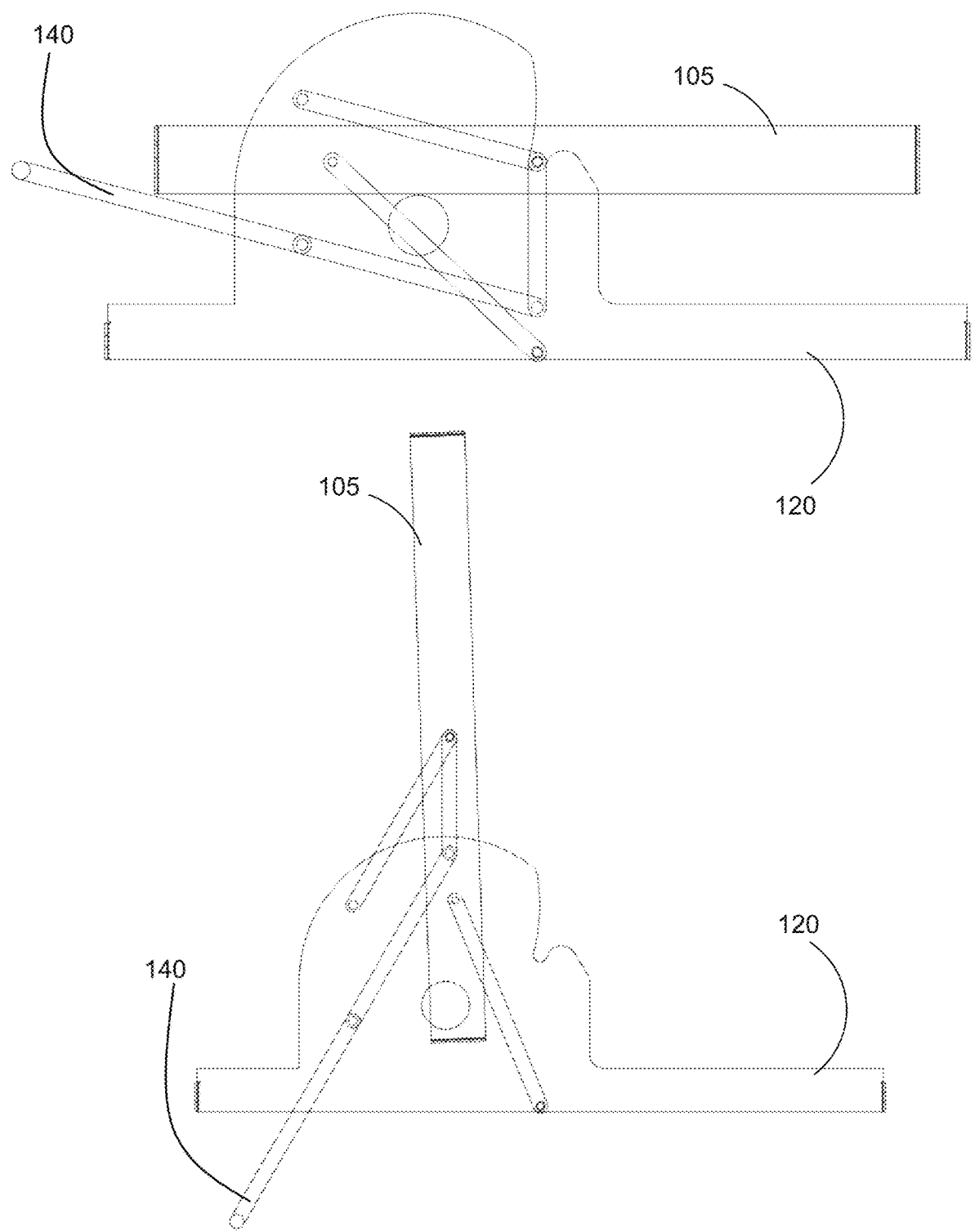
FIG. 6 is a side view of the food containing assembly in a horizontal position and a side view of the food containing assembly in a vertical position according to one or more embodiments of the presently disclosed subject matter.

FIG. 6 illustrates the food containing assembly 100 with the frame 105 in a vertical position and in the horizontal position. In one embodiment of the presently disclosed subject matter, the legs 120 remain stationary and the hand bar apparatus 140 moves in concert with the frame 105.

Figure 7:
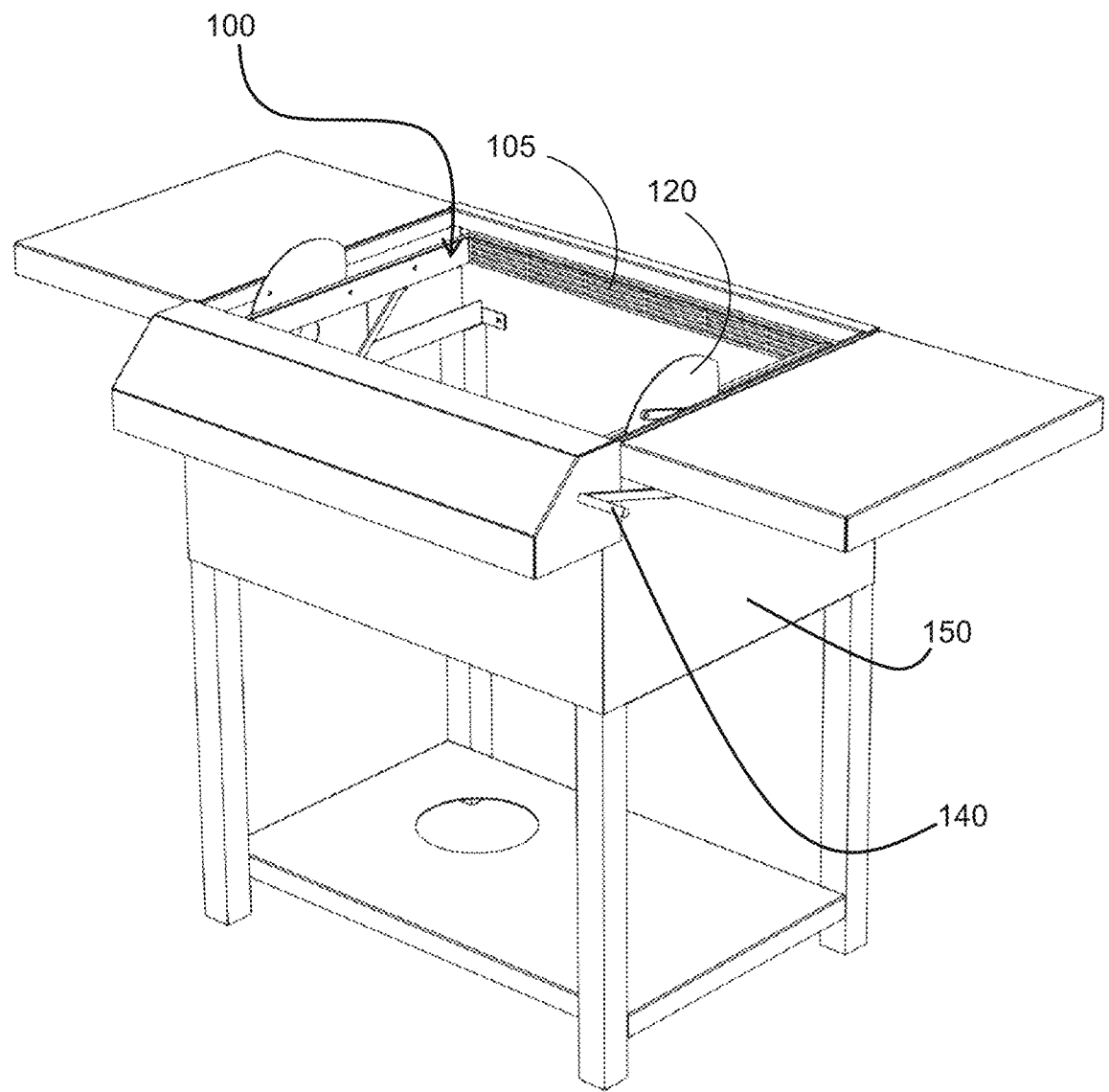
FIG. 7 illustrates the food containing assembly resting inside a housing according to one or more embodiments of the presently disclosed subject matter.

FIG. 7 is a view of the food containing assembly 100 resting inside the firebox 150. In one embodiment of the presently disclosed subject matter the food containing assembly 100 is permanently affixed inside the firebox 150. In another embodiment the food containing assembly 100 is held in the firebox 150 by lateral pressure and can be removed and inserted into another firebox.

Figure 8:
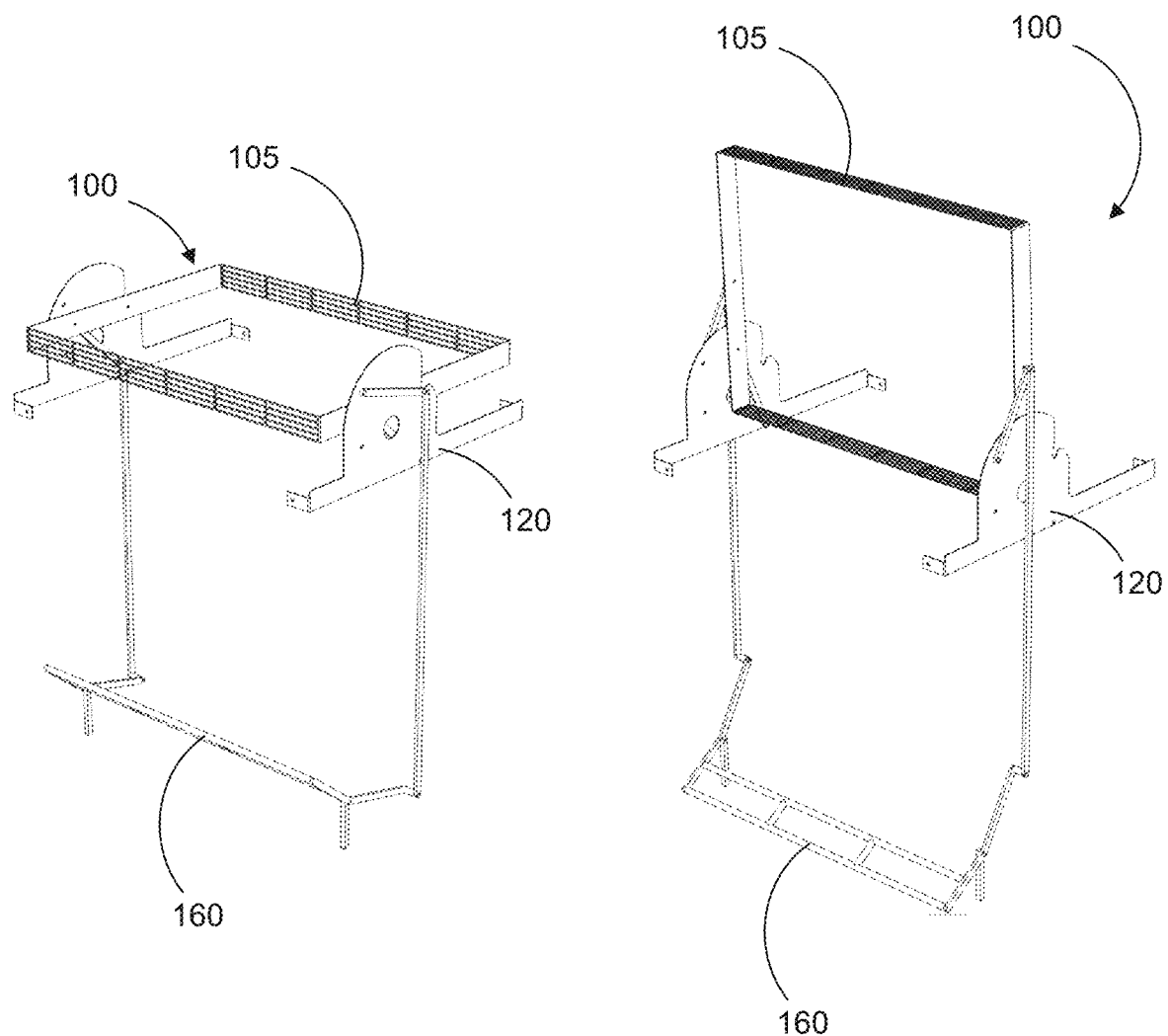
FIG. 8 illustrates two perspective views of the food containing assembly in combination with a foot bar apparatus according to one or more embodiments of the presently disclosed subject matter.

FIG. 8 illustrates the food containing assembly 100 where the actuator is a foot bar apparatus 160. In FIG. 8 the frame 105 is shown in the horizontal and the vertical position. In one embodiment of the presently disclosed subject matter, the legs 120 remain stationary and the foot bar apparatus 160 moves in concert with the frame 105.

Figure 9:
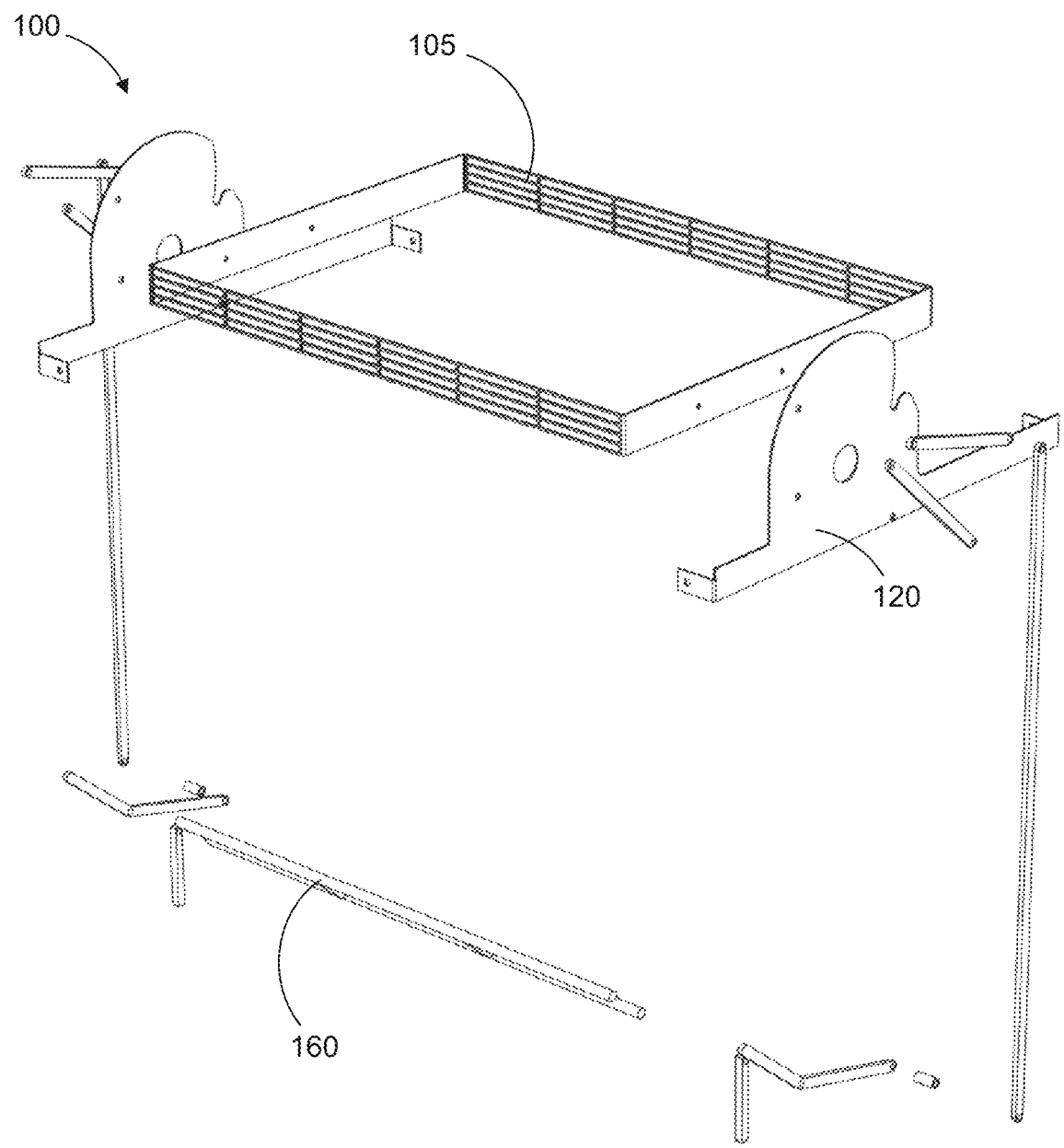
FIG. 9 is an exploded view of the food containing assembly in combination with the foot bar apparatus according to one or more embodiments of the presently disclosed subject matter.
Figure 10:
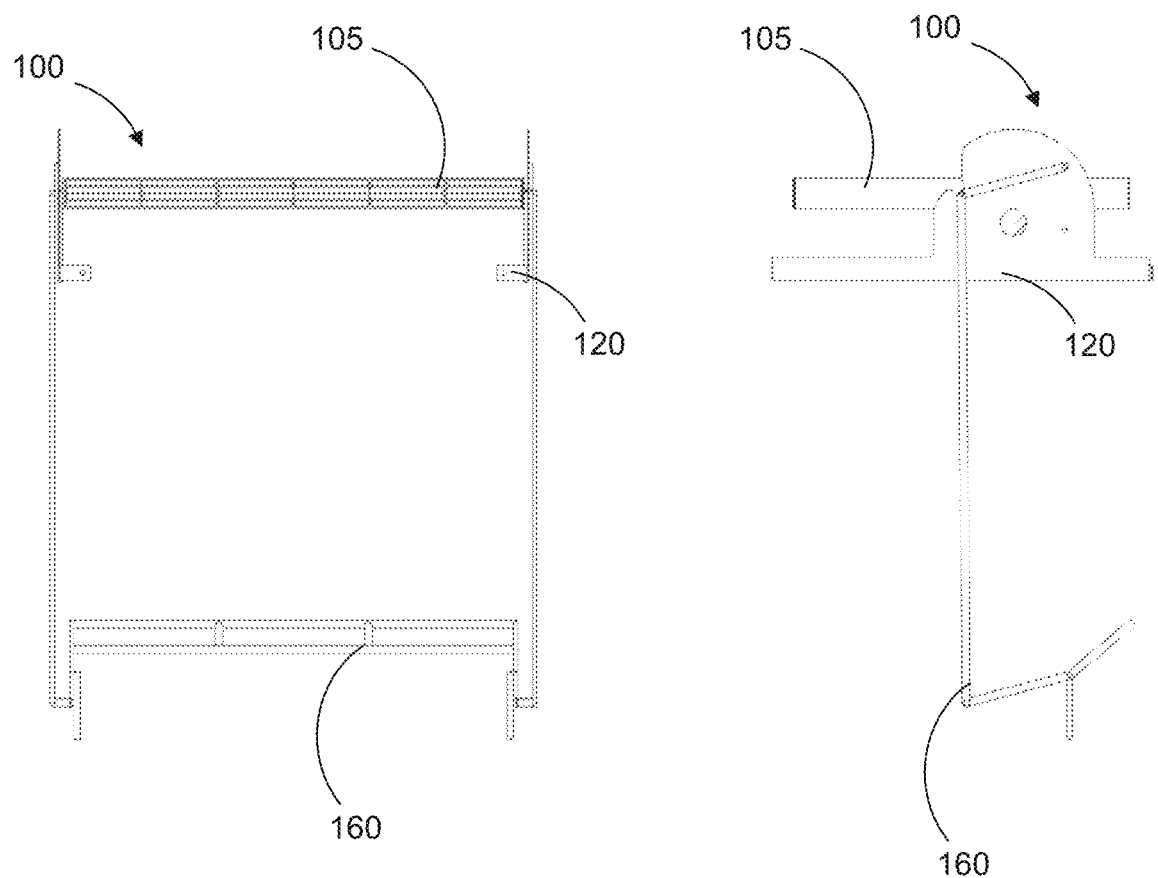
FIG. 10 is front and side view of the food containing assembly in combination with the foot bar apparatus according to one or more embodiments of the presently disclosed subject matter.

FIG. 9 illustrates an exploded view of the food containing assembly 100 where the actuator is the foot bar apparatus 160. As illustrated in FIG. 9 the food containing assembly 100 includes the frame 105, foot bar apparatus 160, and legs 120. FIG. 10 illustrates front and side views of the food containing assembly 100, with the frame 105 in the horizontal position. As shown in FIG. 10, in this embodiment the actuator is the foot bar apparatus 160.

Figure 11:
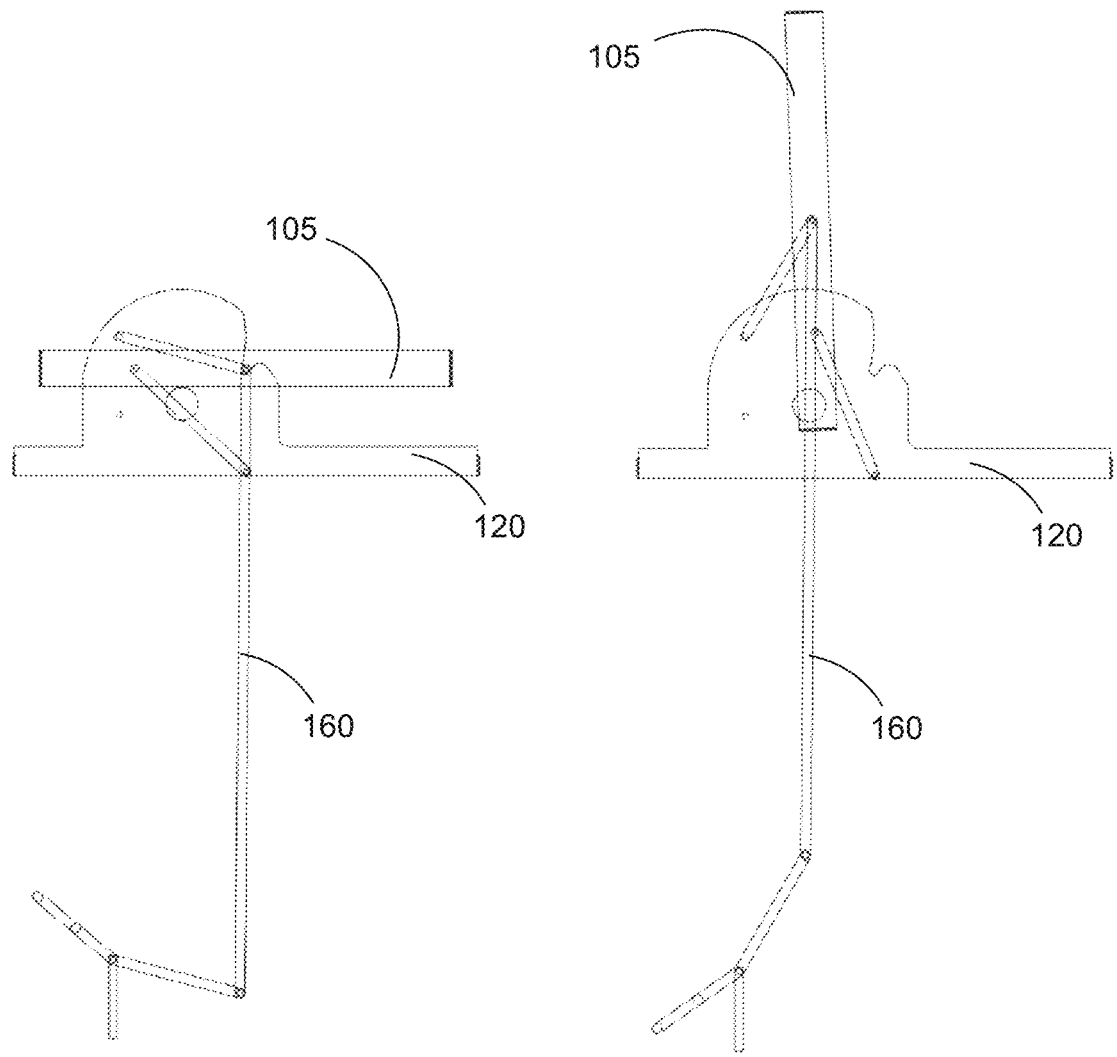
FIG. 11 is a side-by-side comparison of the food containing assembly, in combination with the foot bar apparatus, in the horizontal and vertical position according to one or more embodiments of the presently disclosed subject matter.

FIG. 11 illustrates the food containing assembly 100 with the frame 105 in a vertical position and in the horizontal position. In one embodiment of the presently disclosed subject matter, the legs 120 remain stationary and the foot bar apparatus 160 moves in concert with the frame 105.

Figure 12:
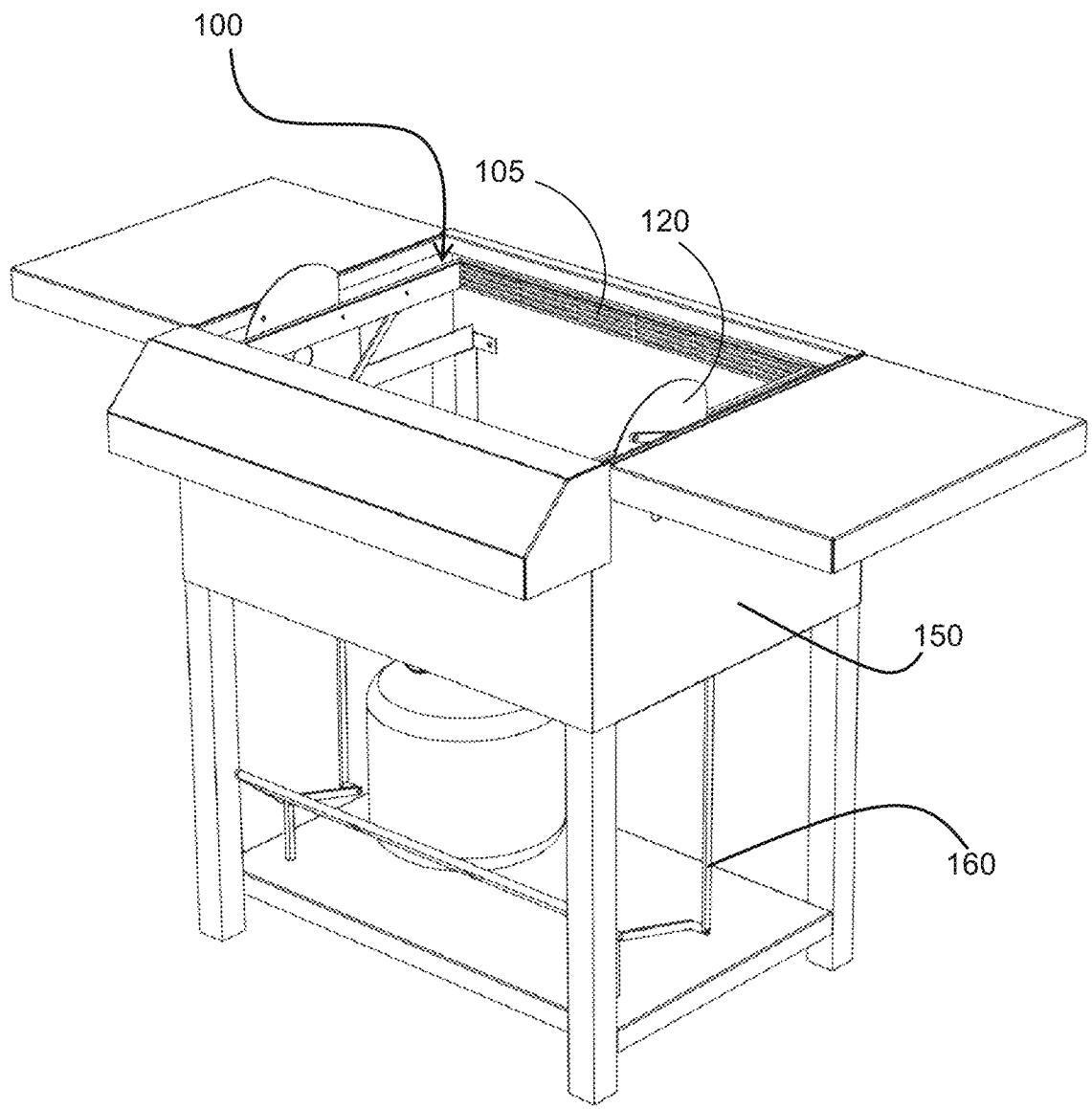
FIG. 12 is perspective view of the food containing assembly in combination with the foot bar apparatus which rests inside the housing according to one or more embodiments of the presently disclosed subject matter.

FIG. 12 is a view of the food containing assembly 100 resting inside the firebox 150. In one embodiment of the presently disclosed subject matter the food containing assembly 100 is permanently affixed inside the firebox 150. In another embodiment the food containing assembly 100 is held in the firebox 150 by lateral pressure and can be removed and inserted into another firebox. In this embodiment the foot bar apparatus 160 is shown extending from the bottom of the firebox 150.

Figure 13:
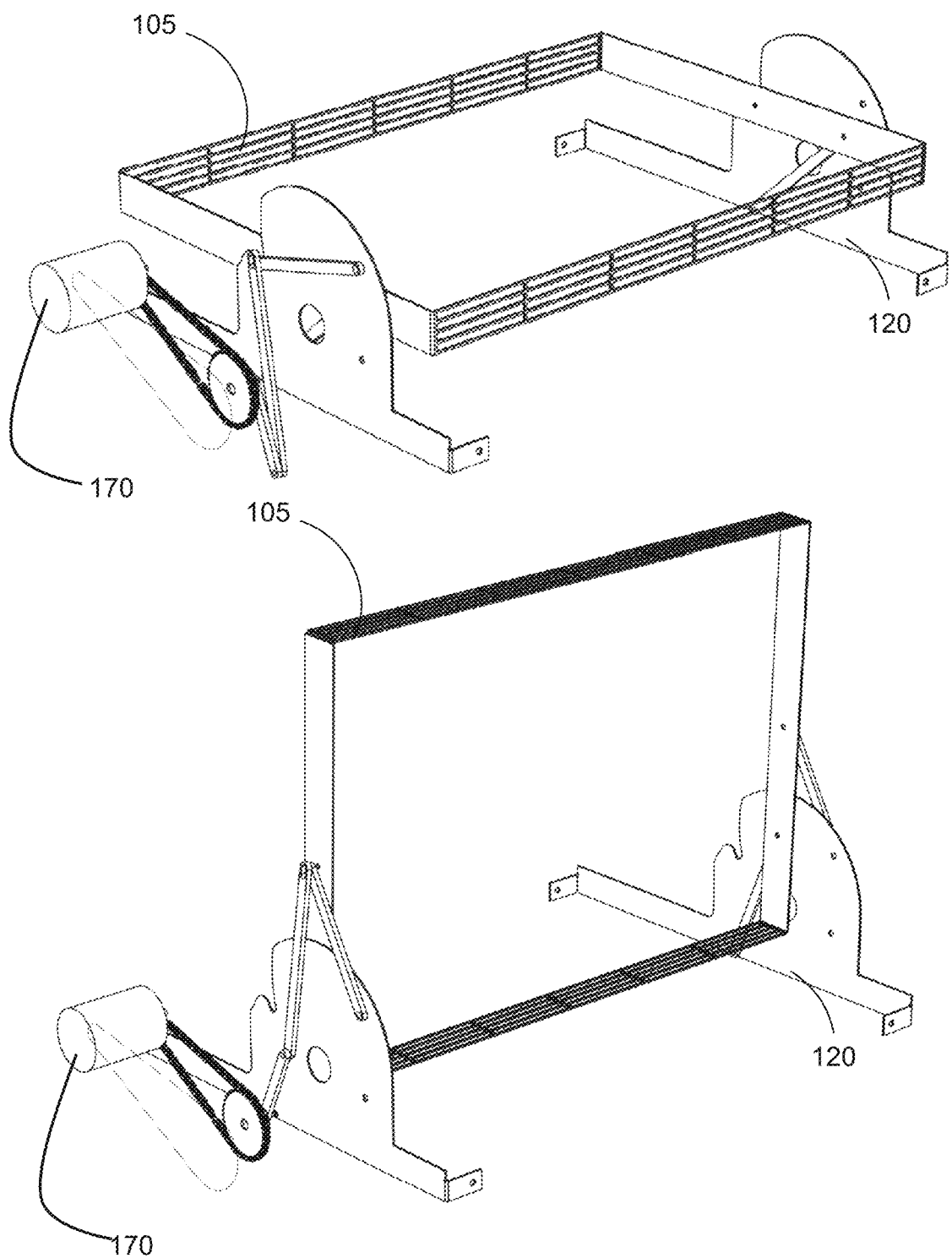
FIG. 13 is the food containing assembly with a motorized actuator in the horizontal and vertical positions according to one or more embodiments of the presently disclosed subject matter.

FIG. 13 illustrates the food containing assembly 100 where the actuator is an electric motor apparatus 170. In FIG. 13 the frame 105 is shown in the horizontal and the vertical position. The frame 105 is connectedly engaged with the legs 120 and the electric motor apparatus 170. The electric motor apparatus 170 can be activated by push button or wirelessly using Bluetooth, WiFi, or any other wireless communication methods known or used in the art.

Figure 14:
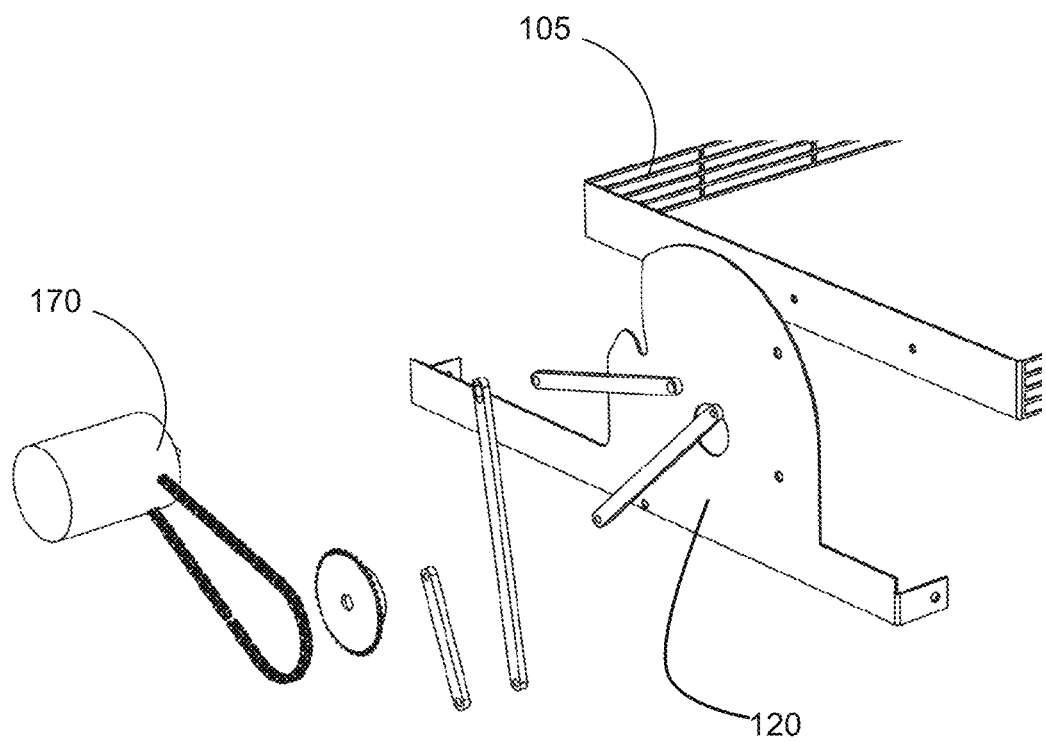
FIG. 14 is an exploded view of the food containing assembly with a motorized actuator according to one or more embodiments of the presently disclosed subject matter.
Figure 15:
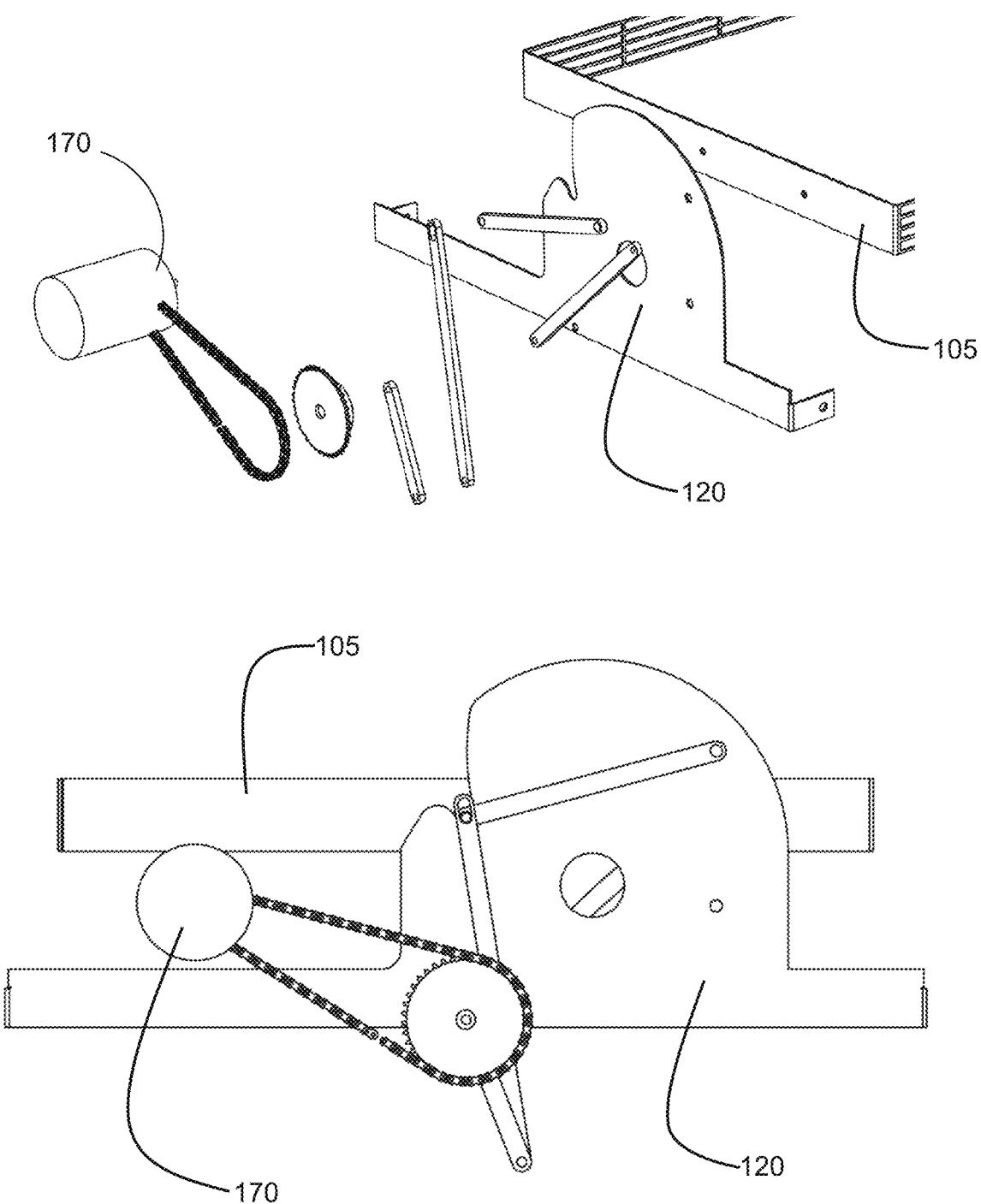
FIG. 15 is a side view of the food containing assembly with the motorized actuator according to one or more embodiments of the presently disclosed subject matter.

FIG. 14 illustrates an exploded view of the electric motor apparatus 170. A perspective exploded view of the electric motor apparatus 170 is also illustrated in FIG. 15, alongside an assembled side view of the electric motor apparatus.

Figure 16:
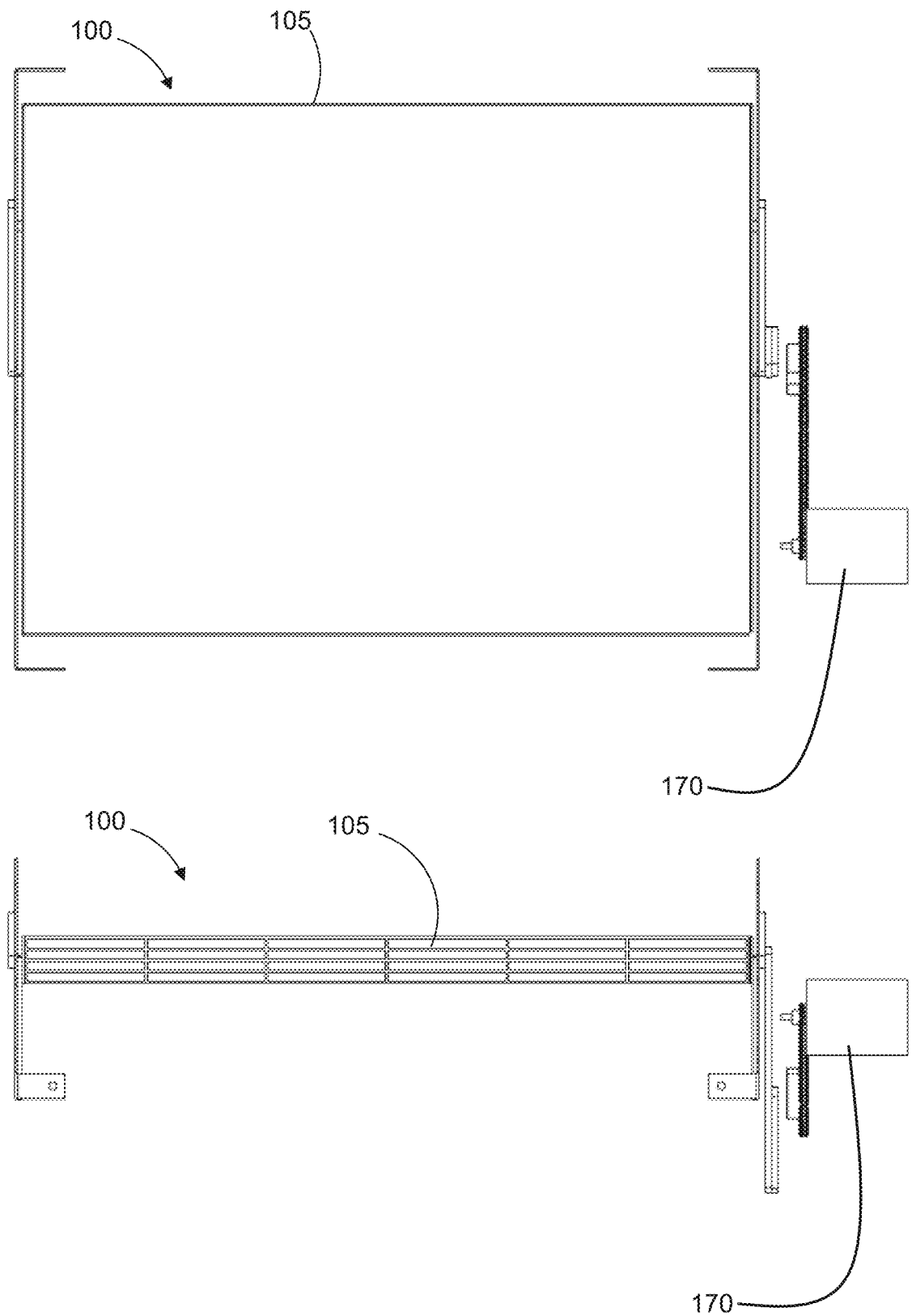
FIG. 16 is a front facing view of the food containing assembly with the motorized actuator in a horizontal and vertical position according to one or more embodiments of the presently disclosed subject matter.

FIG. 16 illustrates the food containing assembly 100 with the frame 105 in a vertical position and in the horizontal position. In one embodiment of the presently disclosed subject matter, the legs 120 remain stationary while the electric motor apparatus 170 moves in concert with the frame 105.

Figure 17:
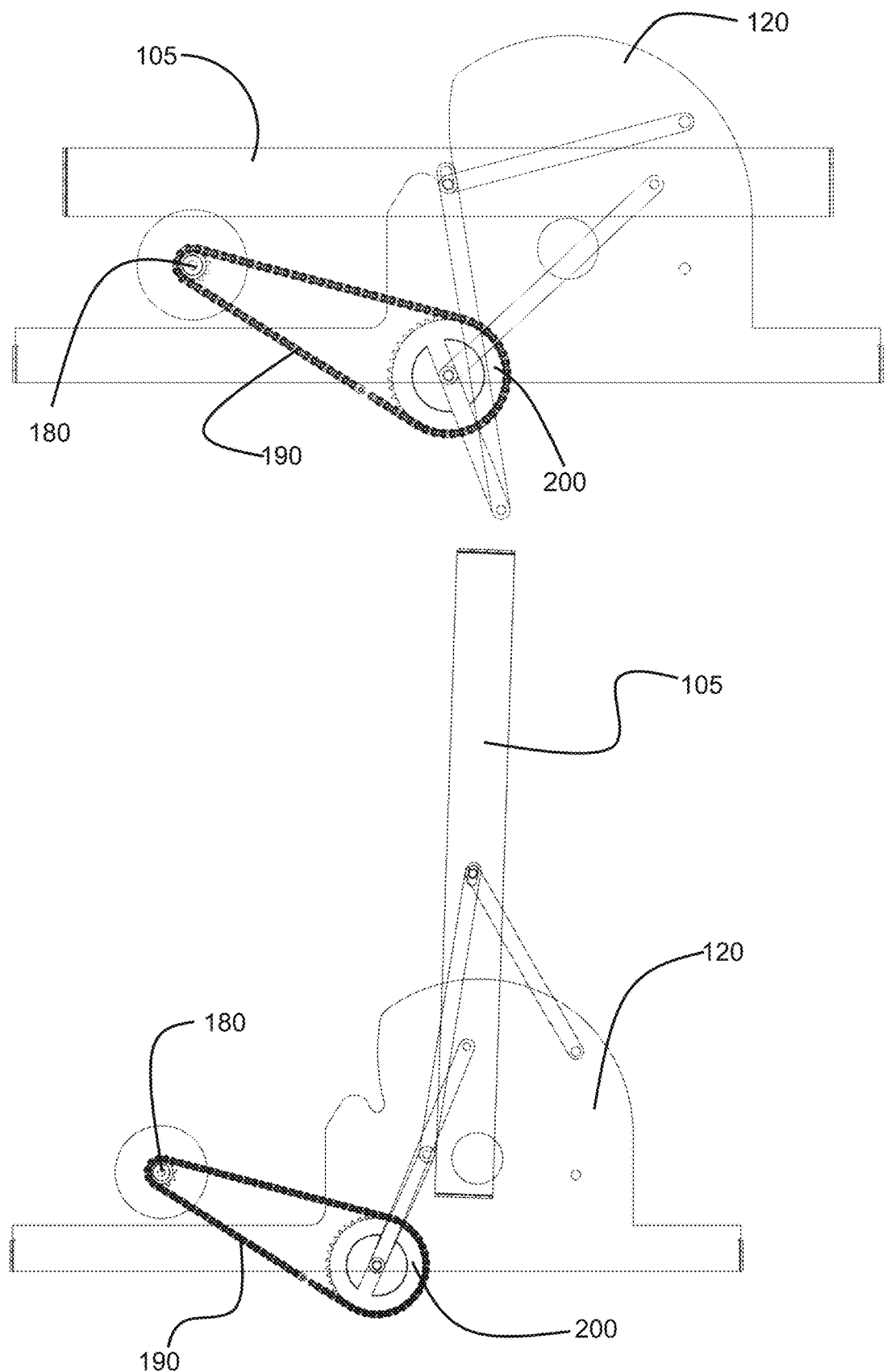
FIG. 17 is a side facing view of the food containing assembly with the motorized actuator in a horizontal and vertical position according to one or more embodiments of the presently disclosed subject matter.

FIG. 17 illustrates the food containing assembly 100 with the frame 105 in a vertical position and the frame 105 in the horizontal position. The inside of the electric motor apparatus 170 is shown in FIG. 17. In one embodiment of the presently disclosed subject matter, the electric motor apparatus 170 is activated, a first gear 180 rotates and engages a chain 190, the chain 190 turns a second gear 200, where rotation of the second gear 200 alters the orientation of the frame 105.

Figure 18:
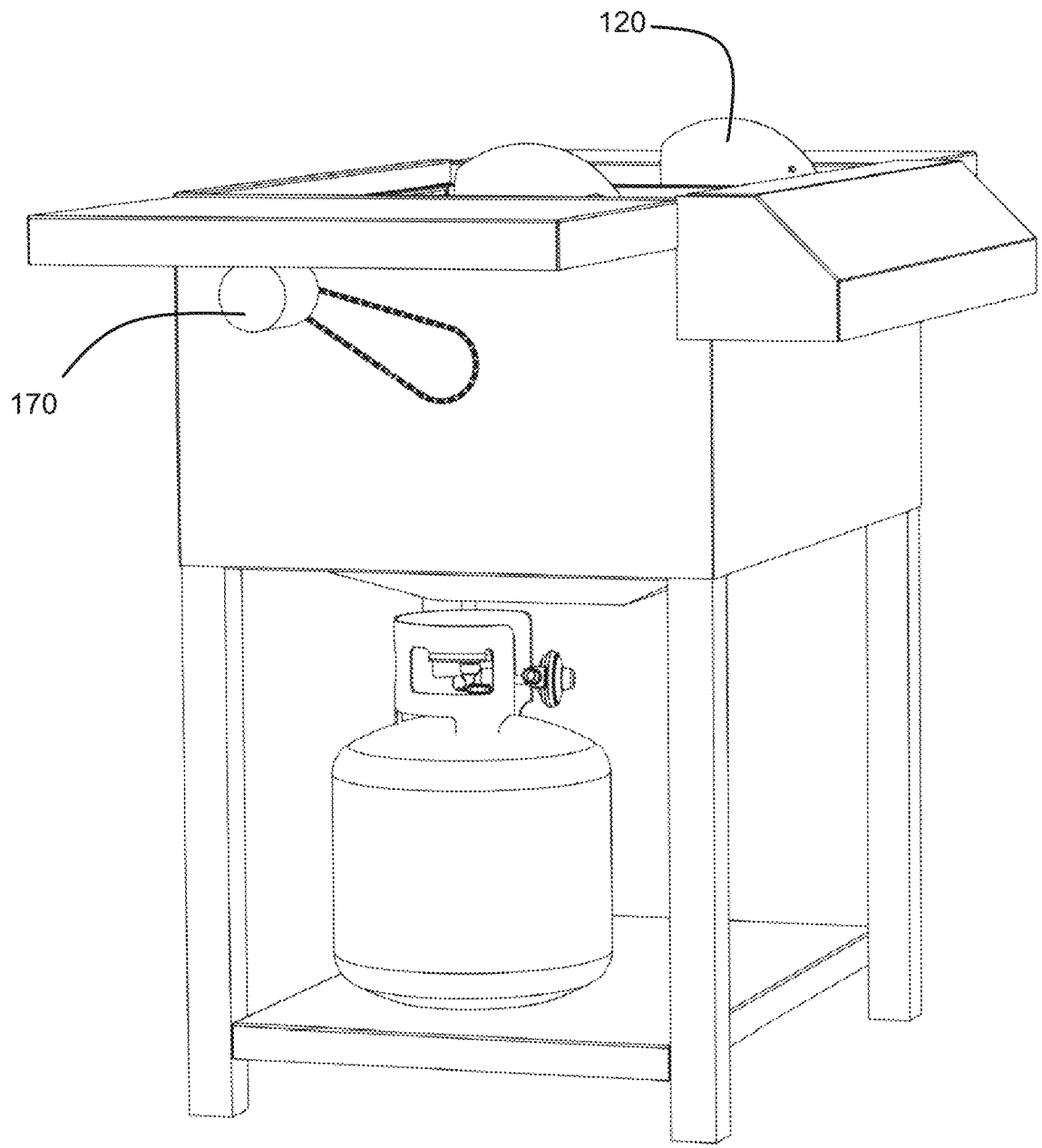
FIG. 18 is a perspective view of the food containing assembly with the motorized actuator resting inside the housing according to one or more embodiments of the presently disclosed subject matter.

FIG. 18 is a view of the food containing assembly 100 resting inside the firebox 150. In one embodiment of the presently disclosed subject matter the food containing assembly 100 is permanently affixed inside the firebox 150. In another embodiment the food containing assembly 100 is stabilized in the firebox 150 by lateral pressure and can be removed and inserted into an alternate firebox. In this embodiment the electric motor apparatus 170 is shown extending from the side of the firebox 150.

Figure 19:
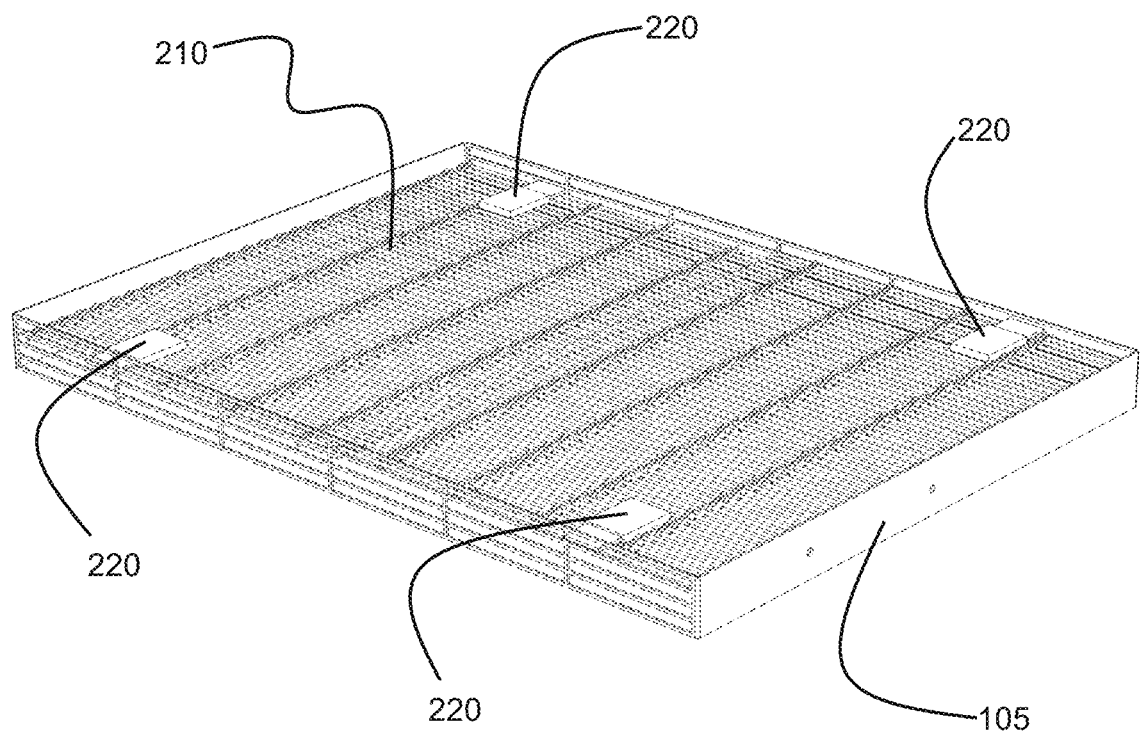
FIG. 19 is a perspective view of a grate according to one or more embodiments of the presently disclosed subject matter.

According to one or more embodiments of the presently disclosed subject matter, the perimeter grate frame 105 is configured to accommodate at least two cooking grates. A first cooking grate 210 is illustrated in FIG. 19. In one embodiment of the presently disclosed subject matter, the first cooking grate 210 includes four latches 220 as shown in FIG. 19. The latches 220 are configured for securing the first cooking grate 210 to the perimeter grate frame 105. The first cooking grate 210 is adjustable and removable; it may interlock with the frame 105 at different heights to secure food against a second cooking grate (not shown).

Figure 20:
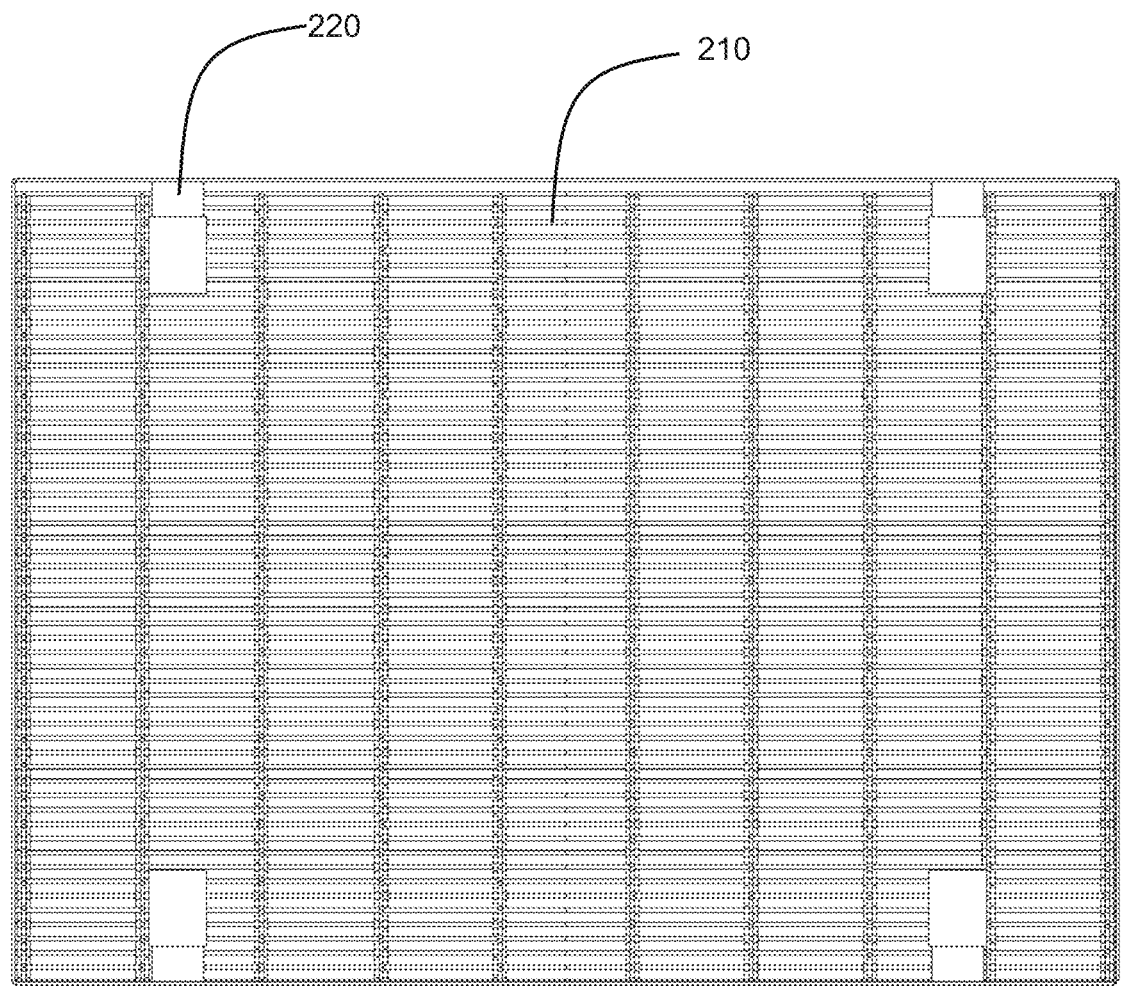
FIG. 20 is a top view of the grate according to one or more embodiments of the presently disclosed subject matter.

The latches 220 operate as illustrated in FIG. 20. Four latches are enough to provide stability to the first cooking grate 210, but more or less may be used. The latches 220 may employ any mechanism known or used in the art, including but not limited to, a latch bolt, draw latch, spring lock, slam latch, cam lock, Norfolk latch, Suffolk latch, crossbar, or toggle latch. FIG. 20 illustrates a top view of the first cooking grate 210 including four latches 220.

Figure 21:
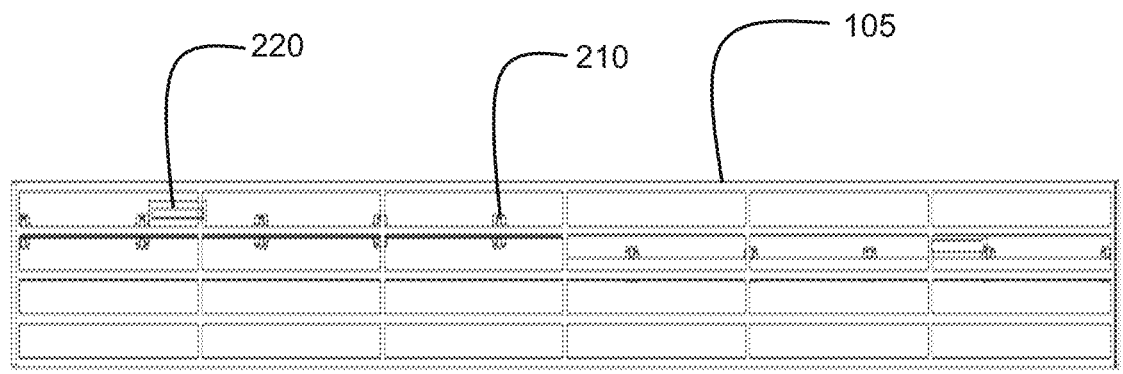
FIG. 21 is front facing, expanded view of the grate according to one or more embodiments of the presently disclosed subject matter.

FIG. 21 illustrate a front view of the frame 105 engaged to the first cooking grate 210. The latches 220 are used to secure the first cooking grate 210 to the frame 105.

Figure 22:
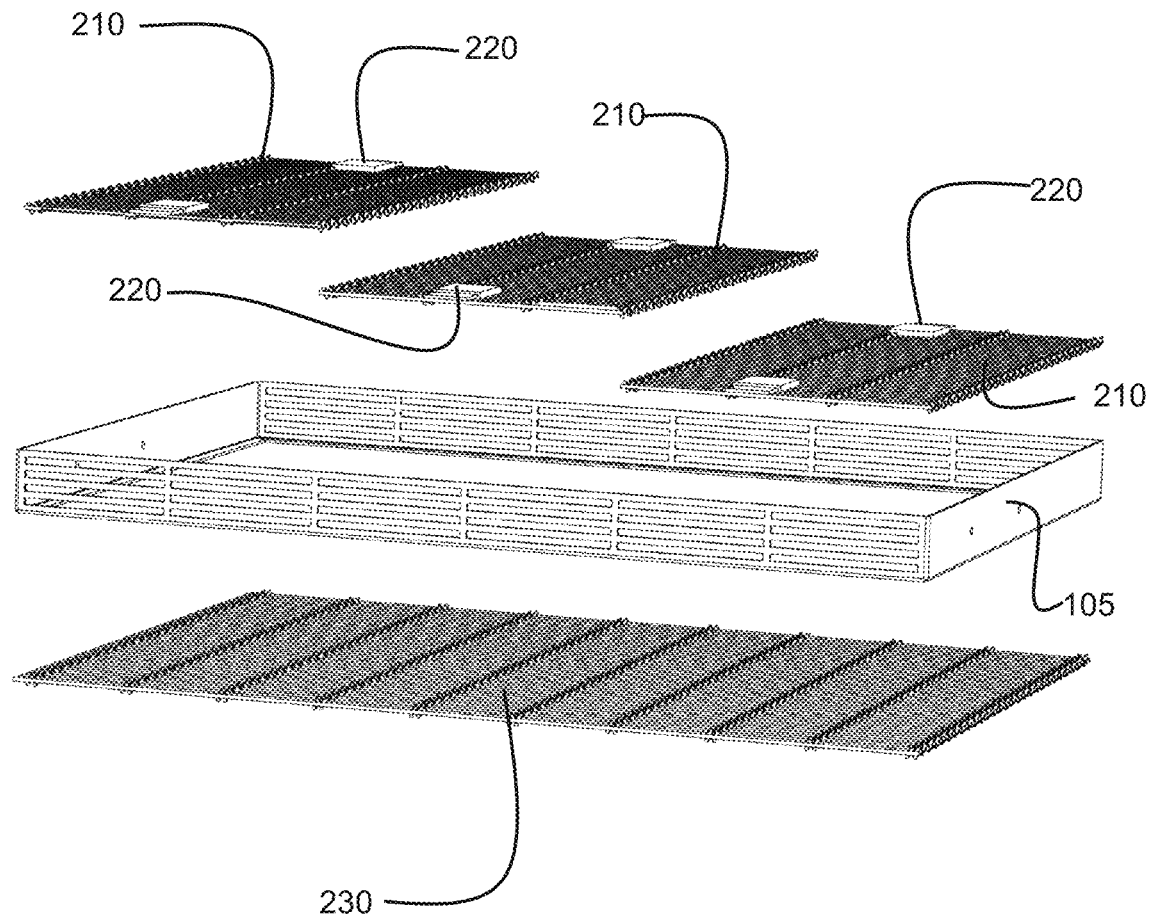
FIG. 22 is an exploded view of the grate according to one or more embodiments of the presently disclosed subject matter.

According to one or more embodiments of the presently disclosed invention the perimeter grate frame 105, three first cooking grates 210, and one second cooking grate 230 are illustrated in FIG. 22. As depicted in FIG. 22 each first cooking grate 210 has two latches 220. The frame 105 may incorporate one or more T-bars (not shown) to help support and partition the first cooking grates 210. The first cooking grates 210 may have handles (not shown) to facilitate lifting the first cooking grates 210 out of the frame 105.

As illustrated in FIG. 22 the second cooking grate 230 may be a single continuous piece. The second cooking grate 230 may also be several pieces. The second cooking grate 230 may be permanently affixed to the frame 105, or it may be detachable and configured in a manner similar to the first cooking grate 210.

Figure 23:
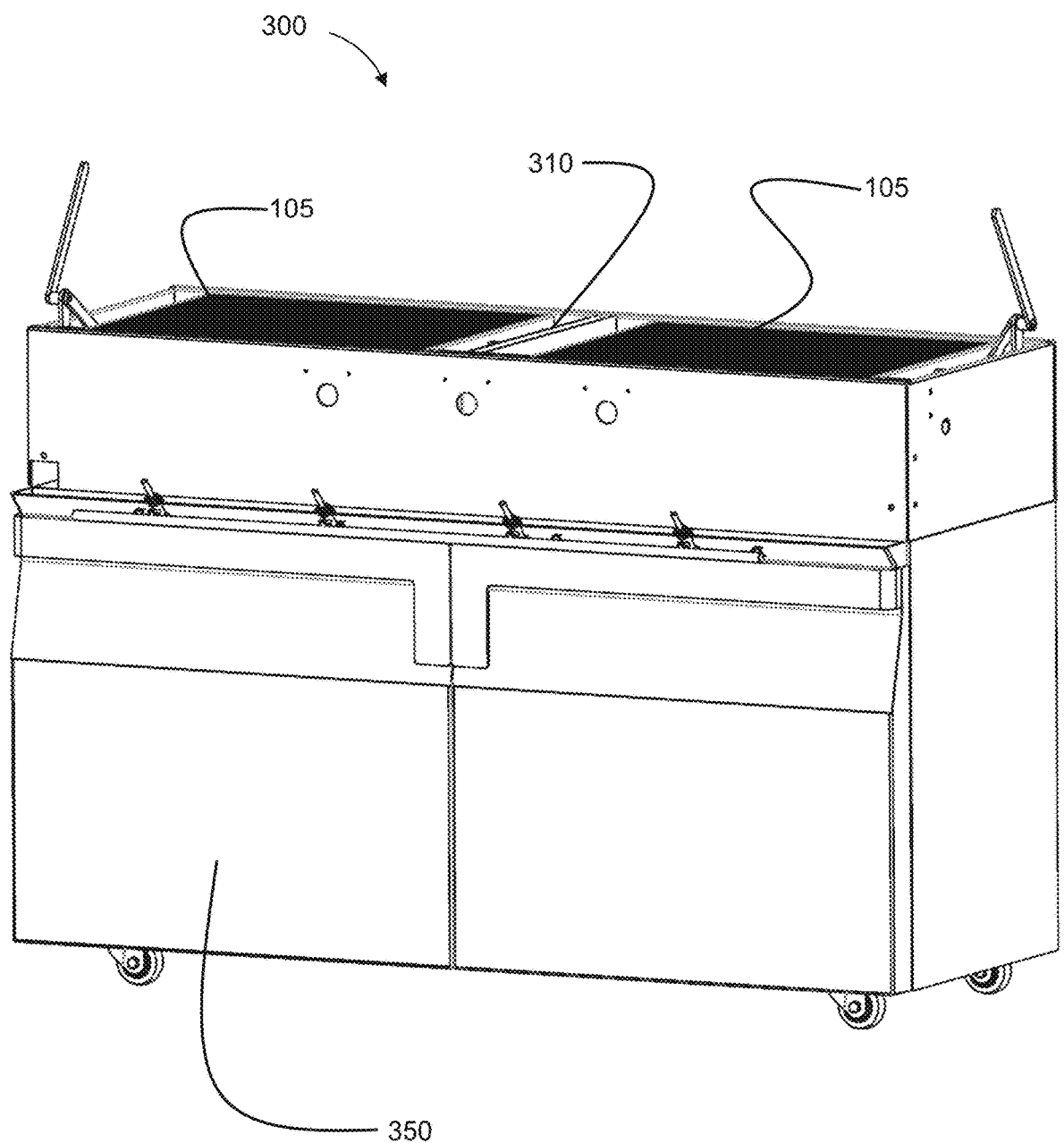
FIG. 23 is a front facing view of the housing according to one or more embodiments of the presently disclosed subject matter.
Figure 24:
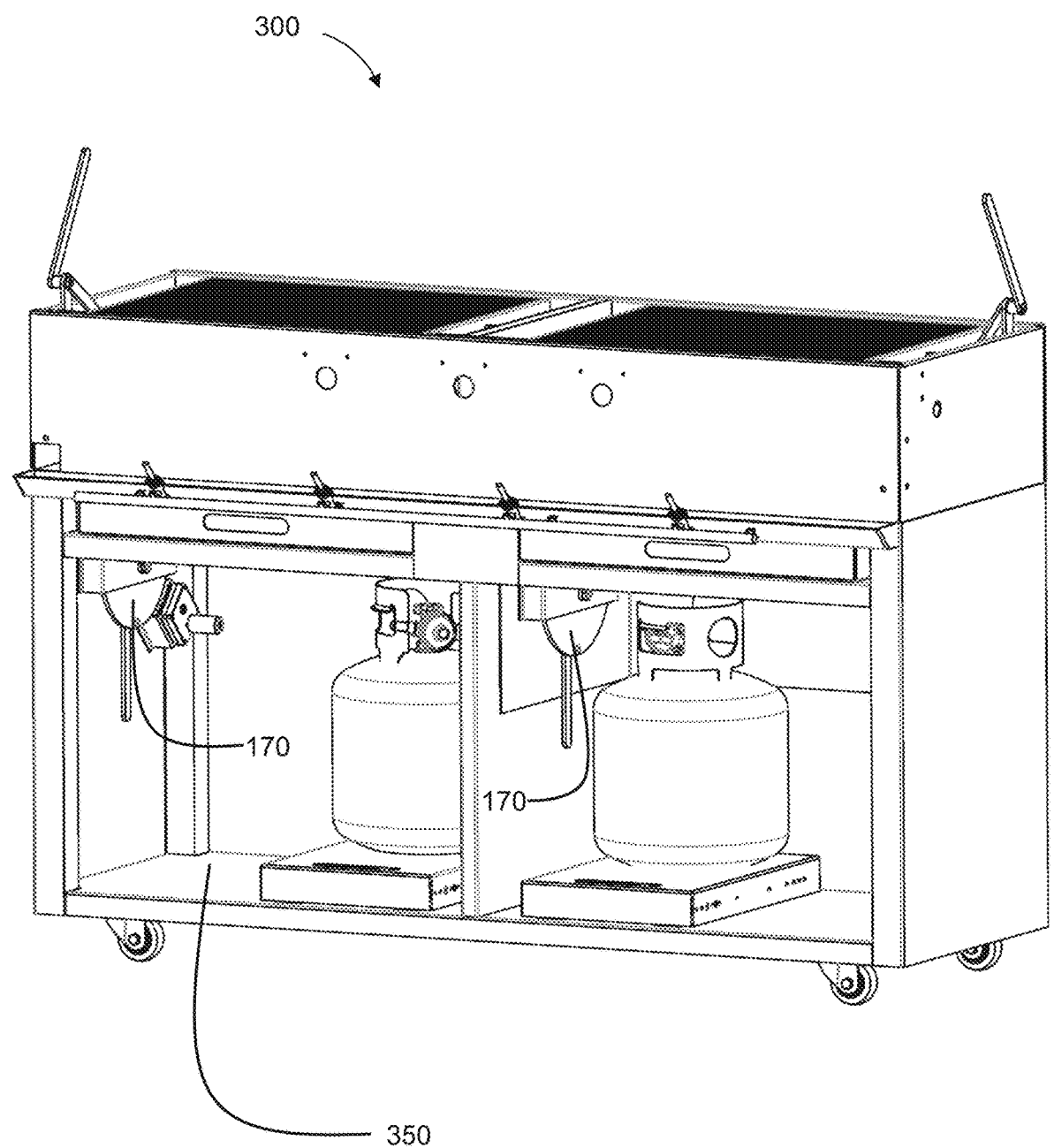
FIG. 24 is a front facing view of the housing according to one or more embodiments of the presently disclosed subject matter.
Figure 25:
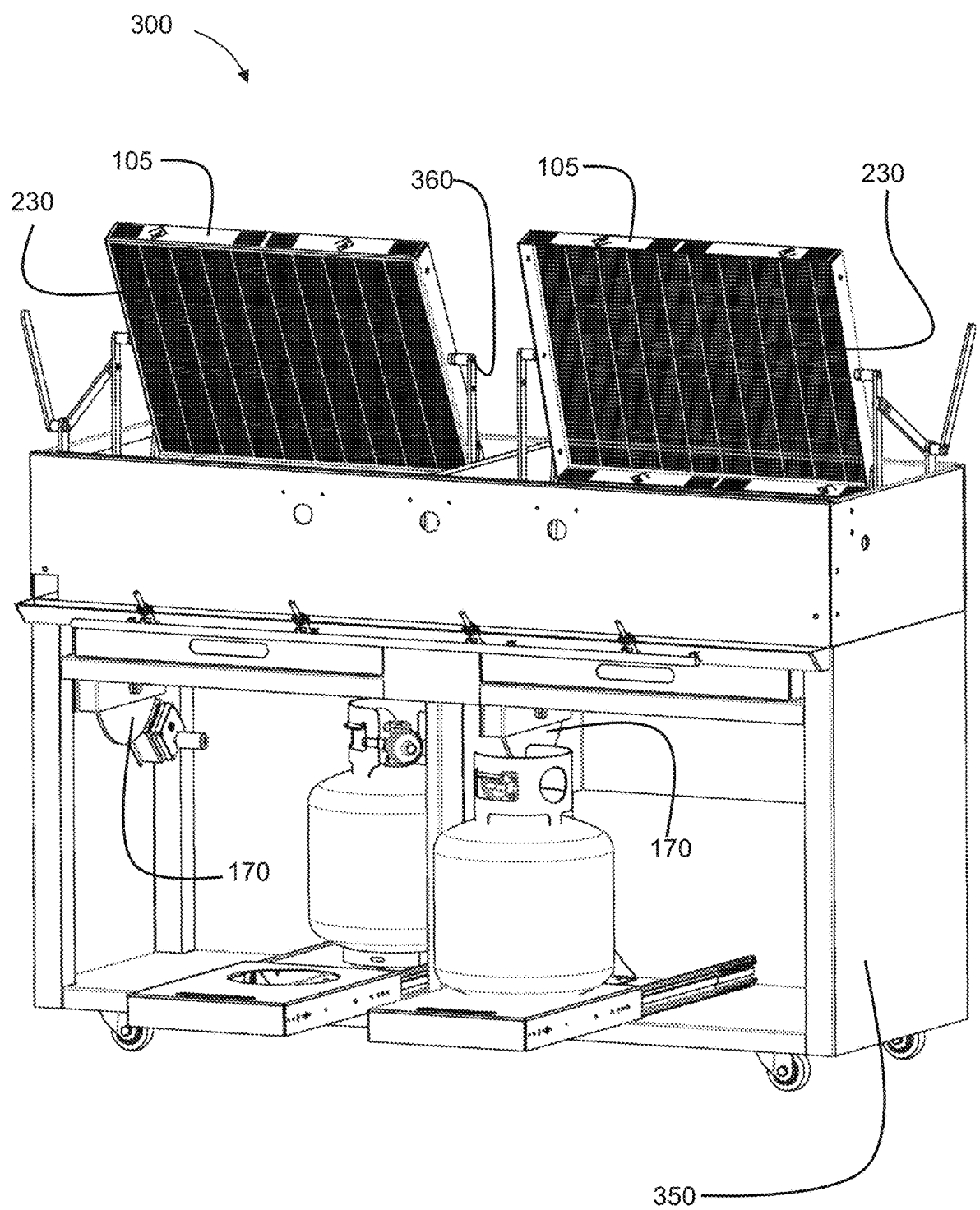
FIG. 25 is a front facing view of the housing according to one or more embodiments of the presently disclosed subject matter.

Another embodiment of the presently disclosed subject matter is disclosed in FIG. 23. Here a grill 300 is shown having a housing 350 and two separate perimeter grate frames 105 separated by a partition 310. FIG. 24 illustrates the inside of the grill 300. The grill 300 has two separate electric motor apparatuses 170 that are capable of operating independently. FIG. 25 illustrates a front view of the electric motor apparatus 170 in operation. As the perimeter grate frame 105 rotates, the second cooking grate 230 is exposed.

As the perimeter grate frame 105 completes a 180 degree rotation, the first cooking grate 210 is exposed to the heating element. According to one or more embodiments, and as illustrated in FIG. 25, the heating element is fueled by a propane tank. The heating element may be fueled by any substance known or used in the art, including but not limited to, propane, natural gas, charcoal, wood and electricity.

According to one or more embodiments of the presently disclosed subject matter, as the perimeter grate frame 105 begins its rotation, it is lifted by the rockers 360. The rotation takes place above the firebox 150. This allows the frame 105 enough clearance to rotate completely without coming into contact with burners, charcoal, or any other elements which may be inside the firebox 150. There is enough space vertical space above the firebox 150 for the frame 105 to rotate completely. The frame 105 may be positioned so that the lid of the grill has to be open for the rotation to take place. The frame 105 may also be positioned such that the lid of the grill can be closed during the rotation. The interaction between the rockers 360 and the frame 105 is illustrated in FIGS. 25, 26, 27A, 27B, 27C, and 27D.

Figure 26:
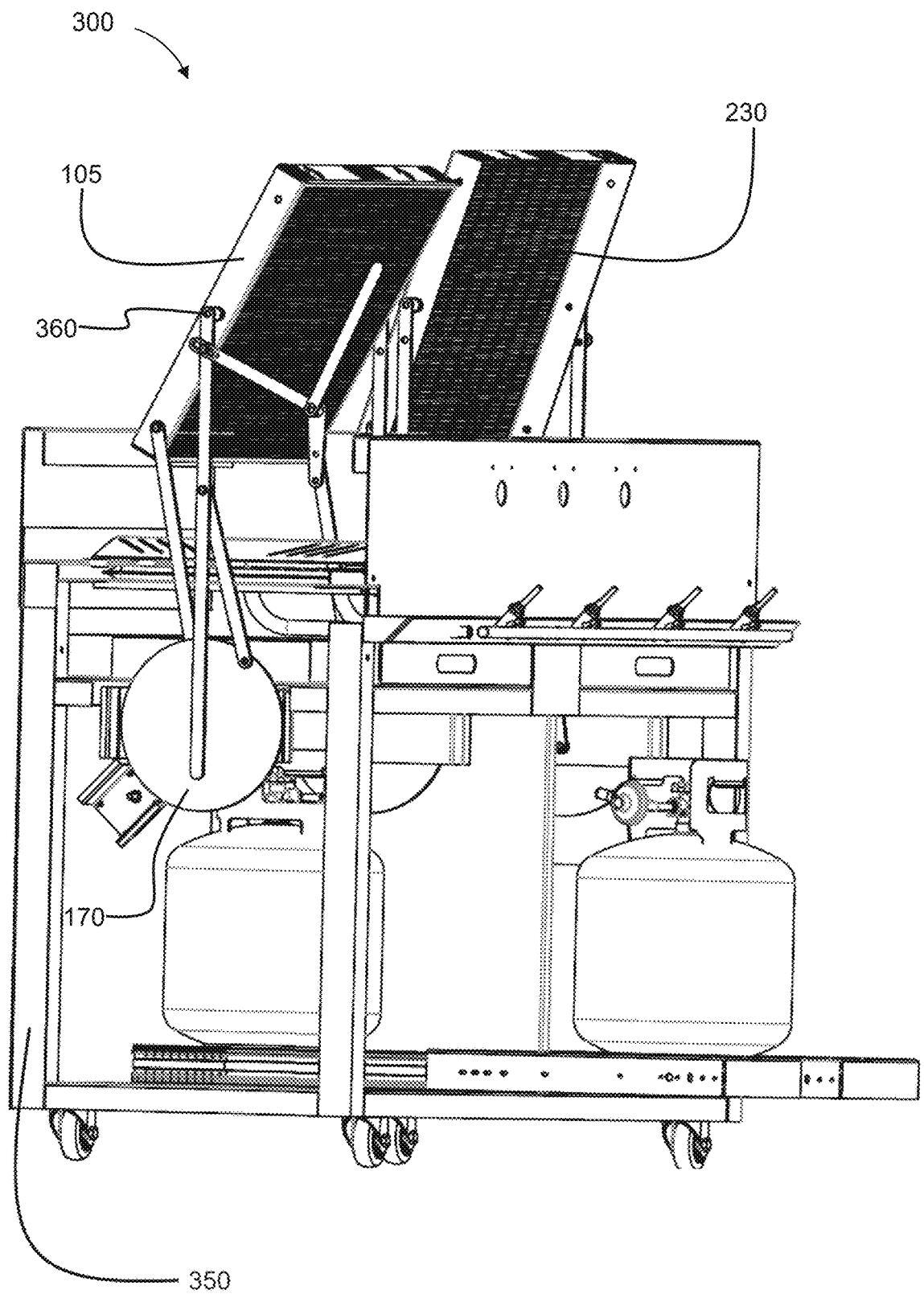
FIG. 26 is a pellucid side view of the housing according to one or more embodiments of the presently disclosed subject matter.

FIG. 26 illustrates a side view of the grill 300 in an operation mode. According to one or more embodiments, the actuator is the electric motor apparatus 170. Two separate perimeter grate frames 105 are shown in FIG. 26. The frames 105 may operate independently or with synchronicity. The electric motor apparatus 170 can be activated by push button or wirelessly using Bluetooth, WiFi, or any other wireless communication methods known or used in the art. The electric motor apparatus 170 must have a power source. The power source could be a battery that is rechargeable through AC power, a battery that is rechargeable through solar power, standalone AC power, or a combination thereof. The electric motor apparatus 170 may also include a digital or manual safety lock to prevent unauthorized or accidental activation. The electric motor apparatus 170 may also include a variable speed setting.

Figure 27A:
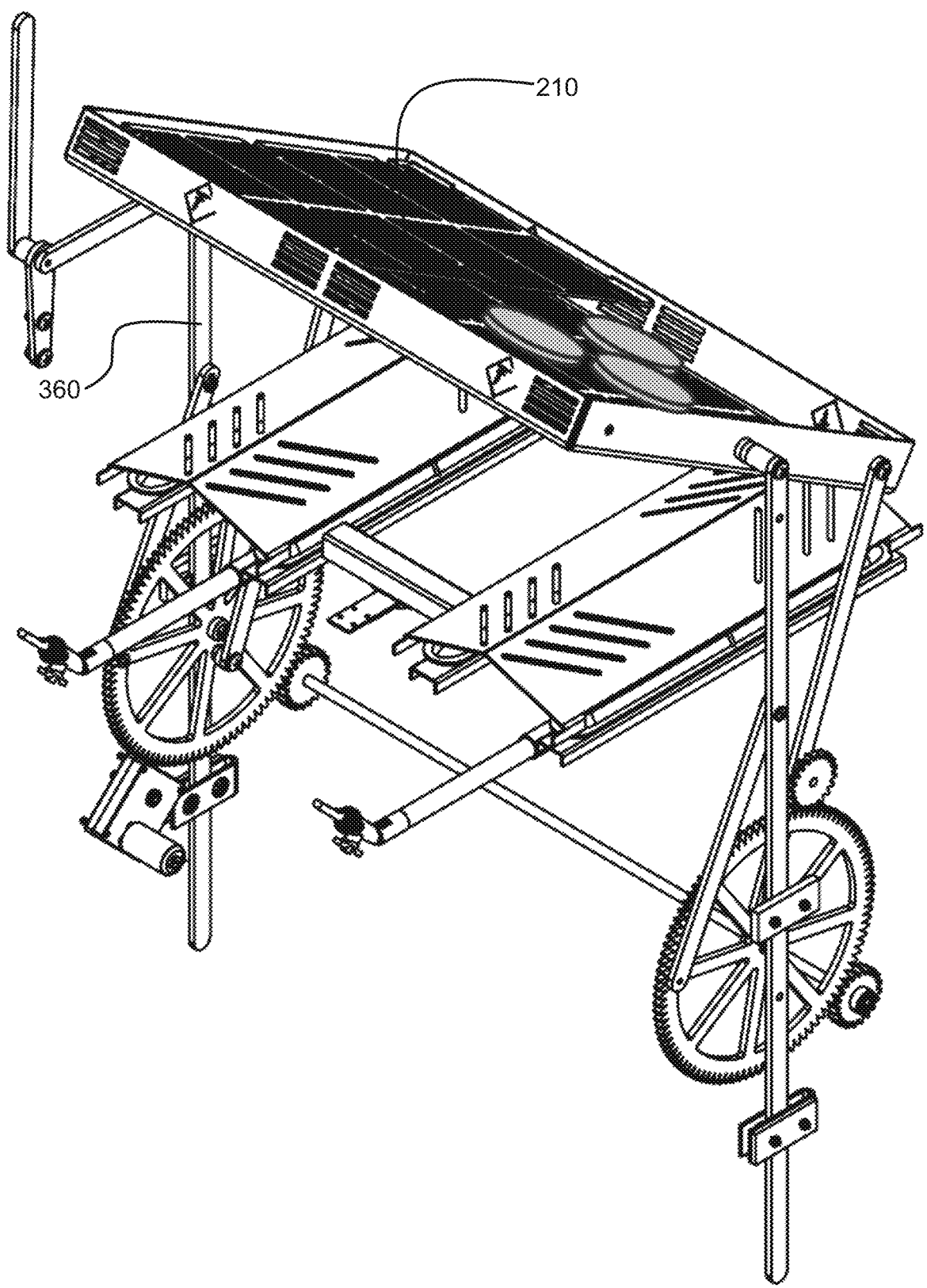
FIG. 27A is an illustration of the food containing assembly in an operation mode according to one or more embodiments of the presently disclosed subject matter.
Figure 27B:
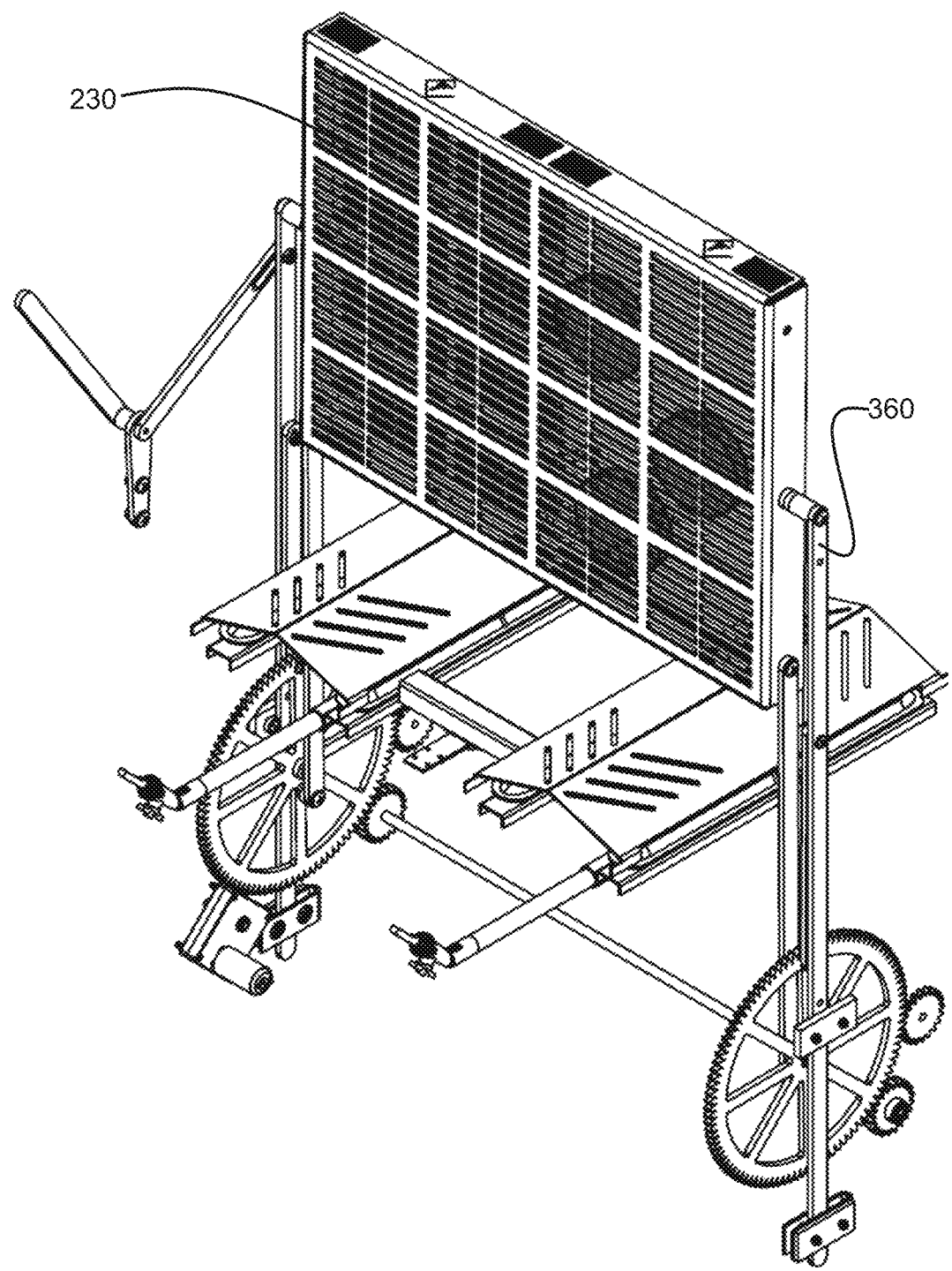
FIG. 27B is an illustration of the food containing assembly in an operation mode according to one or more embodiments of the presently disclosed subject matter.
Figure 27C:
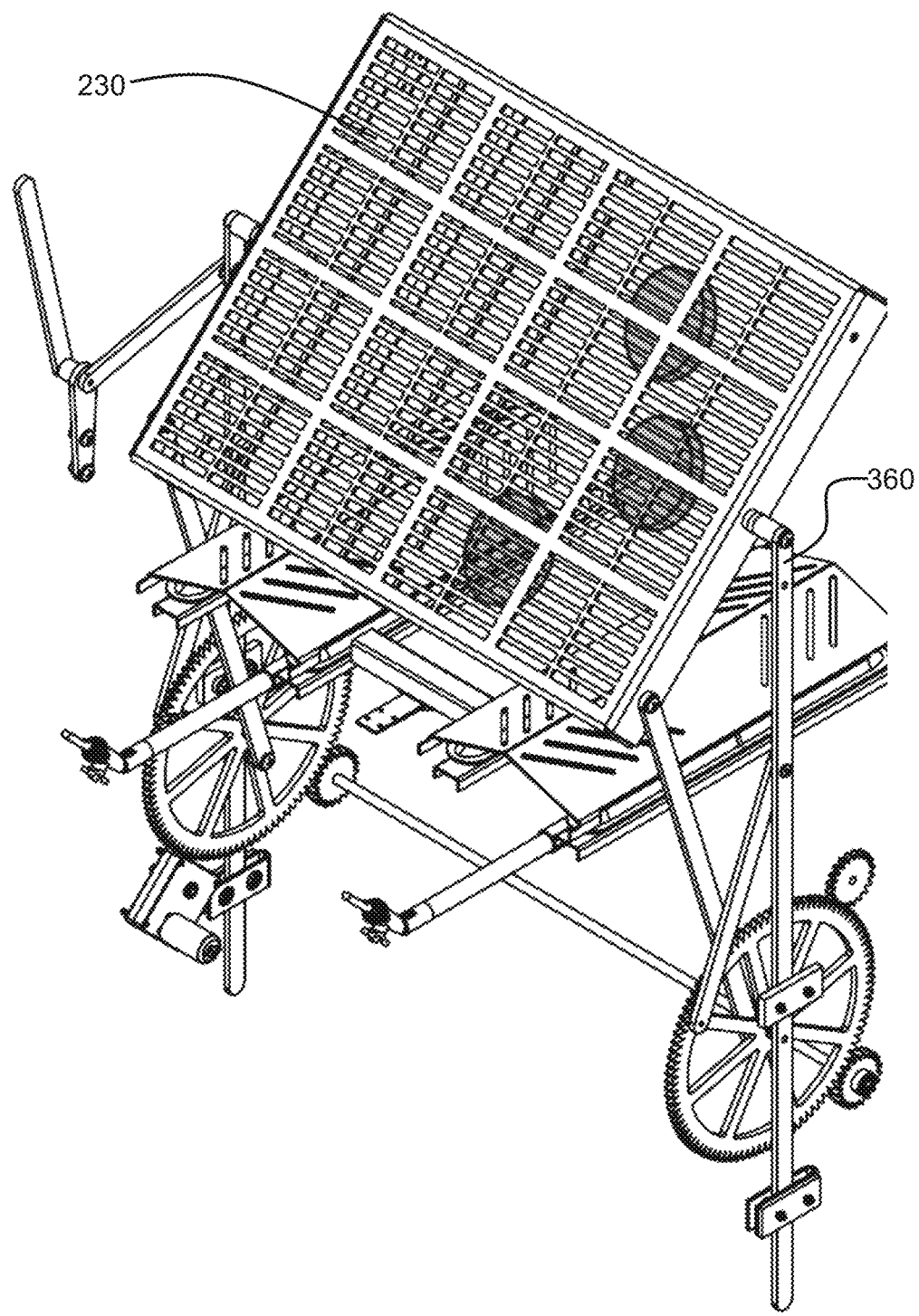
FIG. 27C is an illustration of the food containing assembly in an operation mode according to one or more embodiments of the presently disclosed subject matter.
Figure 27D:
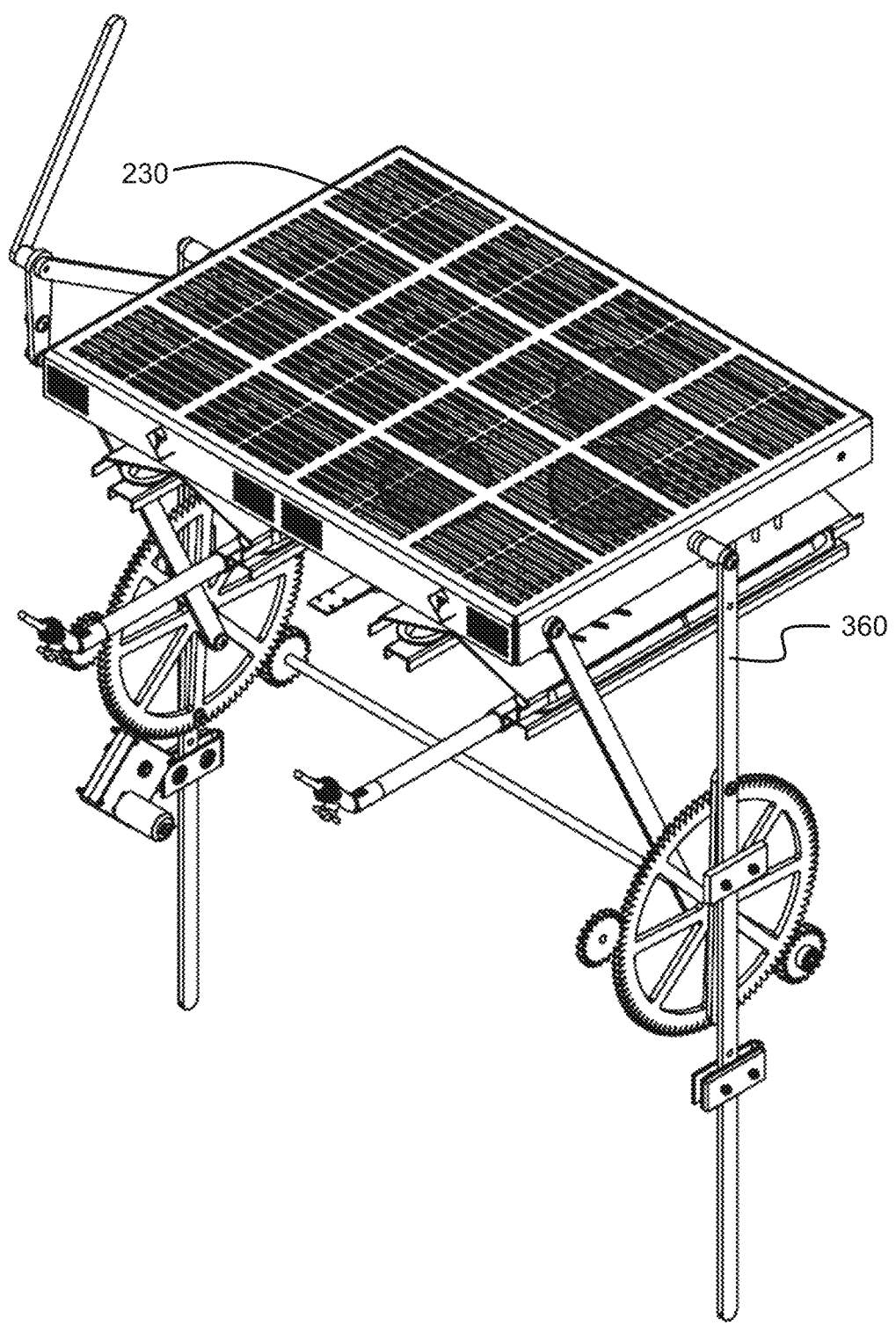
FIG. 27D is an illustration of the food containing assembly in an operation mode according to one or more embodiments of the presently disclosed subject matter.

FIGS. 27A, 27B, 27C, 27D illustrate the food containing assembly 100 in an operation mode. In FIG. 27A half of the first cooking grate 210 is shown to illustrate the position of food as the food containing assembly 100 is operated. FIG. 27B shows the food held between the first cooking grate 210 and the second cooking grate 230. FIG. 27C shows the assembly as it continues its operation with the second cooking grate 230 now facing upwards. FIG. 27D shows the food containing assembly 100 after completing a full 180 degree rotation with the second cooking grate 230 facing upwards and the first cooking grate 210 facing downwards. As is illustrated in this embodiment, the rockers 360 lift the perimeter grate frame 105 before and during its rotation. The rockers 360 then bringing the frame 105 back down to a resting position.

The food containing assembly 100 may be operated by a mobile application. The mobile application may be communicatively engaged with a temperature sensor in order to monitor temperature inside the grill 300. The mobile application may be used to track grilling time. The mobile application may also be used to activate the electric motor apparatus 170 in order to rotate the perimeter grate frames 105. The mobile application may also change the speed of rotation of the perimeter grate frames 105.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the description of the mobile application.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the description of the mobile application.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in description of the mobile application.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed:

1. A method of operating a grill having a food containing assembly comprising:
    installing a first cooking grate in a perimeter grate frame and in spaced-apart relationship to a second cooking grate to which food is placed on;
    cooking the food for a period of time;
    translating the food containing assembly, wherein the perimeter grate frame rotates at least 180 degrees from an original position,
    rockers engaged with the perimeter grate frame and configured to lift the frame in a vertical direction as the frame is rotated;
    cooking the food for an additional period of time;
    translating the food containing assembly to the original position;
    displacing the first cooking grate from the perimeter grate frame; and
    removing the food.

2. The method of claim 1, wherein translating the food containing assembly comprises operating a hand bar apparatus.

3. The method of claim 1, wherein translating the food containing assembly comprises operating a foot bar apparatus.

4. The method of claim 1, wherein translating the food containing assembly comprises activating an electric motor apparatus.

5. A grill for hands-free rotation and flipping of food to promote even cooking, the grill comprising:
    a firebox that includes a food containing assembly, wherein the food containing assembly includes a first cooking grate and a spaced-apart second cooking grate to which food is positioned therebetween, the food containing assembly including an actuator for translating the first and second cooking grates;
    rockers engaged with the cooking grates and configured to lift the cooking grates in a vertical direction as the cooking grates are translated;
    a lid; and
    a housing.

6. The grill of claim 5, wherein the lid comprises a handle.

7. The grill of claim 5, wherein the actuator comprises a motor which is engaged to a power source.

8. The grill of claim 7, wherein the power source is at least one of a battery that is rechargeable through AC power, a battery that is rechargeable through solar power, and stand-alone AC power.

9. The grill of claim 5, wherein the housing comprises a propane tank, a power source, and wheels.

10. A grill including a food containing assembly, wherein the food containing assembly comprises a first cooking grate and a spaced apart second cooking grate, wherein the first cooking grate and the second cooking grate are rotatable relative to a housing of the grill such that food displaced within the food containing assembly can be rotated relative to a heating source while maintaining placement relative to the food containing assembly; and rockers engaged with the cooking grates and configured to lift the cooking grates in a vertical direction as the food is rotated.

11. A food containing assembly comprising:
    a perimeter grate frame, wherein the frame is substantially rectangular in shape;
    a first cooking grate having latches configured to engage with a top side of the perimeter grate frame, the latches positioned across opposing edges of the first cooking grate;
    a second cooking grate engaged to a bottom side of the perimeter grate frame;
    two legs engaged to opposite sides of the perimeter grate frame;
    rockers engaged with the perimeter grate frame and configured to lift the frame in a vertical direction as the frame is rotated; and
    an actuator connectedly engaged with the perimeter grate frame.

12. The food containing assembly of claim 11, wherein the actuator is at least one of a hand bar apparatus, a foot bar apparatus, and an electric motor apparatus.

* * * * *